(12) United States Patent
Kitawaki et al.

(10) Patent No.: US 11,404,082 B2
(45) Date of Patent: *Aug. 2, 2022

(54) ALUMINIUM ALLOY SUBSTRATE FOR MAGNETIC DISK, METHOD FOR FABRICATING THE SAME, AND MAGNETIC DISK COMPOSED OF ALUMINIUM ALLOY SUBSTRATE FOR MAGNETIC DISK

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Makoto Yonemitsu, Tokyo (JP); Takashi Nakayama, Tokyo (JP); Kimie Imakawa, Tokyo (JP); Hideyuki Hatakeyama, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/648,481

(22) PCT Filed: Sep. 18, 2019

(86) PCT No.: PCT/JP2019/036525
§ 371 (c)(1),
(2) Date: Mar. 18, 2020

(87) PCT Pub. No.: WO2020/059742
PCT Pub. Date: Mar. 26, 2020

(65) Prior Publication Data
US 2021/0201946 A1    Jul. 1, 2021

(30) Foreign Application Priority Data
Sep. 21, 2018   (JP) .............................. JP2018-176961

(51) Int. Cl.
*G11B 5/73* (2006.01)
*G11B 5/84* (2006.01)
(Continued)

(52) U.S. Cl.
CPC ............ *G11B 5/73919* (2019.05); *B21B 1/22* (2013.01); *B21B 3/00* (2013.01); *C22C 21/00* (2013.01);
(Continued)

(58) Field of Classification Search
CPC ... G11B 5/73919; G11B 5/8404; C22C 21/00; C22C 21/02; C22C 21/06; C22C 21/08;
(Continued)

(56) References Cited

U.S. PATENT DOCUMENTS 10,767,247 B2 *   9/2020   Murata .................. C23C 18/32
2002/0149876 A1   10/2002  Masaharu et al.
(Continued)

FOREIGN PATENT DOCUMENTS

CN    105745344 A    7/2016
CN    107109543 A    8/2017
(Continued)

OTHER PUBLICATIONS

English machine translation of WO2017/163943, Kobe Steel, Sep. 2017.*
(Continued)

*Primary Examiner* — Holly Rickman
(74) *Attorney, Agent, or Firm* — Greer, Burns & Crain, Ltd.

(57) ABSTRACT

Provided is an aluminium alloy substrate for a magnetic disk, a method for fabricating the substrate, and a magnetic disk composed of the aluminium alloy substrate for a magnetic disk. The substrate contains an aluminium alloy composed of one or more elements selected from a group
(Continued)

YOUNG MODULUS AND LOSS FACTOR IN 45° DIRECTION
RELATIVE TO ROLLING DIRECTION OF SUBSTRATE comprising 0.05 to 3.00 mass % (hereinafter abbreviated as "%") of Fe, 0.05% to 3.00% of Mn, 0.05% to 18.00% of Si, 0.05% to 8.00% of Ni, 0.05% to 3.00% of Cr, and 0.05% to 3.00% of Zr, with a balance of Al and unavoidable impurities. The substrate has a Young modulus of 67 GPa or more in each of the 0° direction, 45° direction, and 90° direction relative to the rolling direction of the substrate.

6 Claims, 4 Drawing Sheets

(51) Int. Cl.
  *B21B 1/22* (2006.01)
  *B21B 3/00* (2006.01)
  *C22C 21/00* (2006.01)
  *C22C 21/02* (2006.01)
  *C22F 1/043* (2006.01)
  *C22F 1/00* (2006.01)
(52) U.S. Cl.
  CPC .............. *C22C 21/02* (2013.01); *C22F 1/043* (2013.01); *G11B 5/8404* (2013.01); *C22F 1/00* (2013.01)
(58) Field of Classification Search
  CPC ......... C22C 21/12; C22C 21/14; C22C 21/16; C22C 21/18
  See application file for complete search history.

(56) References Cited

U.S. PATENT DOCUMENTS

| | | |
|---|---|---|
| 2003/0180562 A1 | 9/2003 | Kobayashi et al. |
| 2016/0351224 A1 | 12/2016 | Kitawaki et al. |
| 2017/0327930 A1 | 11/2017 | Kitawaki et al. |
| 2018/0226095 A1 | 8/2018 | Murase et al. |
| 2019/0066724 A1 | 2/2019 | Nakamura et al. |
| 2020/0365180 A1 | 11/2020 | Kitawaki et al. |
| 2020/0377984 A1 | 12/2020 | Kitawaki et al. |
| 2021/0050034 A1* | 2/2021 | Murata ................ B32B 15/015 |

FOREIGN PATENT DOCUMENTS

| | | |
|---|---|---|
| CN | 108368568 A | 8/2018 |
| CN | 108389593 A | 8/2018 |
| CN | 111448611 A | 7/2020 |
| JP | 2002313061 A | 10/2002 |
| JP | 2017179590 A | 10/2017 |
| JP | 2018125056 A | 8/2018 |
| TW | 575504 B | 2/2004 |
| WO | 2016068293 A1 | 5/2016 |
| WO | 2018155237 A1 | 8/2018 |

OTHER PUBLICATIONS

English translation of WO 2017/163943(PCT JP2017/009809), Sep. 28, 17 (Year: 2017), pp. 1-12.*
English abstract of WO2018/143177, Japan, (Year: 2018), pp. 1-6.*
Office Action issued in corresponding CN patent application No. 201980004600.6, dated Apr. 27, 2021.
ISR issued in Int'l. application No. PCT/JP/2019/036525, dated Oct. 21, 2019.
Decision to Grant issued in corresponding JP application No. 2018-176961, dated Feb. 19, 2019 (with translation).
Chinese Office Action for corresponding Chinese Patent Application No. 201980004600.6 dated Oct. 22, 2021.
Concise Handbook of Aluminum Alloy Processing, and English translation thereof.
Chinese Office Action for corresponding Chinese Patent Application No. 201980004600.6 dated Mar. 7, 2022.
Fundamentals of Engineering Materials and Machinery Manufacturing, vol. 1, and English translation thereof.

* cited by examiner

ALUMINIUM ALLOY SUBSTRATE FOR MAGNETIC DISK, METHOD FOR FABRICATING THE SAME, AND MAGNETIC DISK COMPOSED OF ALUMINIUM ALLOY SUBSTRATE FOR MAGNETIC DISK

This is a National Phase Application filed under 35 U.S.C. § 371, of International Application No. PCT/JP2019/036525, filed Sep. 18, 2019, the contents of which are incorporated by reference.

TECHNICAL FIELD

The disclosure relates to an aluminium alloy substrate for a magnetic disk that can achieve preferable fluttering characteristics, a method of fabricating the substrate, and a magnetic disk composed of the aluminium alloy substrate for a magnetic disk.

BACKGROUND ART

Magnetic disks applied to a storage device of a computer are made of substrates having excellent plating characteristics, mechanical characteristics, and processability. For example, some of the substrates are mainly composed of aluminium alloys in accordance with JIS5086 (that is, alloys containing 3.5 to 4.5 mass % of Mg, 0.50 mass % or less of Fe, 0.40 mass % or less of Si, 0.20 to 0.70 mass % of Mn, 0.05 to 0.25 mass % of Cr, 0.10 mass % or less of Cu, 0.15 mass % or less of Ti, 0.25 mass % or less of Zn, with a balance of Al and unavoidable impurities).

In general, a magnetic disk is fabricated by preparing an annular aluminium alloy substrate, plating the aluminium alloy substrate, and then applying a magnetic material onto the surface of the aluminium alloy substrate.

For example, an aluminium alloy magnetic disk composed of the JIS5086 alloy is fabricated as follows. An aluminium alloy material having a certain chemical composition is casted to produce an ingot. This ingot is hot rolled and then cold rolled into a rolled plate having a thickness required as a magnetic disk. This rolled plate is preferably annealed, for example, during the cold rolling process as required. The rolled plate is then punched to yield an annular plate, and is provided with an annular aluminium alloy plate thereon to remove distortion or the like caused by the fabrication process. This annular plate is annealed and flattened while being pressurized on both surfaces of both ends in a pressure annealing process. These processes yield an annular aluminium alloy substrate.

The resulting annular aluminium alloy substrate is subject to pretreatment involving a cutting process, grinding process, degreasing process, etching process, and zincate treatments (Zn substitution). The substrate is then subject to electroless base plating of Ni—P, which is a hard non-magnetic metal. The electroless Ni—P plated surface is polished and provided with a magnetic material by spattering. These processes produce an aluminium alloy magnetic disk.

In recent years, magnetic disks have been required to have higher capacities, higher densities, and higher speeds due to need for multimedia, for example. Since the number of magnetic disks installed in a storage device increases for expanding the capacity, each of the magnetic disks should accordingly have a smaller thickness.

Unfortunately, a disk having a reduced thickness and an increased speed has a lower rigidity and receives an increased exciting force due to an increase in fluid force caused by rapid rotation, and thus often causes disk flutters. That is, the magnetic disk vibrates (flutters) due to unstable airflows generated between rapidly rotating magnetic disks. This phenomenon seems to occur because the head cannot follow large vibration of the magnetic disks composed of substrates having low rigidity. Such disk flutters increase the frequency of errors in positioning of the head, which is a reading unit, and therefore should be reduced.

In addition, in a magnetic disk having a higher density, the size of a magnetic area per one bit is further reduced. Such a reduction in size increases the frequency of reading errors caused by erroneous deviations in positioning of the head. Strongly desired is a reduction in disk flutter, which is the main cause of an error in positioning of the head.

In view of these circumstances, recent demands and studies have been focused on aluminium alloy substrates for magnetic disks having few disk flutters. For example, an airflow reducing component has been proposed that is installed inside a hard disk drive and has a plate facing a disk. Patent Literature 1 discloses a magnetic disk drive equipped with an air spoiler upstream of an actuator. This air spoiler reduces an air flow on a magnetic disk toward the actuator and thus suppresses turbulent vibration of a magnetic head. The air spoiler also prevents disk flutters by reducing an air flow on the magnetic disk. Furthermore, Patent Literature 2 discloses a method of improving the rigidity of an aluminium alloy plate by adding a large amount of Si to the plate, which contributes to an improvement in rigidity.

Unfortunately, in the method disclosed in Patent Literature 1, the effects of preventing disk flutters vary depending on the size of the gap between the substrate for a magnetic disk and the installed air spoiler. The method thus requires high accuracy of components, leading to an increase in costs of the components.

The method of adding a large amount of Si as disclosed in Patent Literature 2 can effectively improve the rigidity and reduce the displacement of a broad peak in the vicinity of the frequencies of 300 to 1500 Hz in which flutters emerge. Unfortunately, this method cannot reduce the displacement of a broad peak in the vicinity of the frequencies of 1500 to 2000 Hz and fails to achieve desired fluttering characteristics.

CITATION LIST

Patent Literature

Patent Literature 1: Unexamined Japanese Patent Application Kokai Publication No. 2002-313061
Patent Literature 2: International Publication No. WO 2016/068293

SUMMARY OF INVENTION

Technical Problem

An objective of the disclosure, which has been accomplished in view of the above situation, is to provide an aluminium alloy substrate for a magnetic disk that can achieve preferable fluttering characteristics of the magnetic disk, a method of fabricating the substrate, and a magnetic disk composed of the aluminium alloy substrate for a magnetic disk.

Solution to Problem

That is, according to a first aspect of the disclosure, an aluminium alloy substrate for a magnetic disk includes an aluminium alloy containing: one or more elements selected from a group comprising 0.05 to 3.00 mass % of Fe, 0.05 to 3.00 mass % of Mn, 0.05 to 18.00 mass % of Si, 0.05 to 8.00 mass % of Ni, 0.05 to 3.00 mass % of Cr, and 0.05 to 3.00 mass % of Zr, with a balance of Al and unavoidable impurities The substrate has a Young modulus of 67 GPa or more in each of a 0° direction, 45° direction, and 90° direction relative to a rolling direction of the substrate.

According to a second aspect of the disclosure, the aluminium alloy may further contain 0.003 to 8.000 mass % of Cu in the substrate according to the first aspect.

According to a third aspect of the disclosure, the aluminium alloy may further contain one or two elements selected from a group comprising 0.05 to 0.90 mass % of Mg and 0.005 to 8.000 mass % of Zn in the substrate according to the first or second aspect.

According to a fourth aspect of the disclosure, the aluminium alloy may further contain one or more elements selected from a group comprising Ti, B, and V at a total content of 0.005 to 0.500 mass % in the substrate according to any one of the first to third aspects.

According to a fifth aspect of the disclosure, a product of a loss factor and a thickness (mm) of the substrate may be $0.7 \times 10^{-3}$ mm or more in each of the 0° direction, 45° direction, and 90° direction relative to the rolling direction of the substrate in the substrate according to any one of the first to fourth aspects.

According to a sixth aspect of the disclosure, a magnetic disk includes: the aluminium alloy substrate for a magnetic disk according to any one of the first to fifth aspects; an electroless Ni—P plated layer on a surface of the substrate; and a magnetic material layer on the plated layer.

According to a seventh aspect of the disclosure, a method of fabricating the aluminium alloy substrate for a magnetic disk according to any one of the first to fifth aspects, includes: a semi-continuous casting step of casting the aluminium alloy to produce an ingot by a semi-continuous casting method; a hot rolling step of hot rolling the ingot to produce a hot rolled plate; a cold rolling step of cold rolling the hot rolled plate; a disk blank punching step of punching the cold rolled plate to produce a disk blank having an annular shape; a pressure annealing step of pressure annealing the disk blank; and a cutting and grinding step of cutting and grinding the pressure annealed disk blank. In the cold rolling step, a difference in rotational speed between upper and lower rollers is 5% or less and a rolling speed is 1000 m/min or less.

According to an eighth aspect of the disclosure, a method of fabricating the aluminium alloy substrate for a magnetic disk according to any one of the first to fifth aspects, includes: a continuous casting step of casting the aluminium alloy to produce a cast plate by a continuous casting method; a cold rolling step of cold rolling the cast plate after continuous casting; a disk blank punching step of punching the cold rolled plate to produce a disk blank having an annular shape; a pressure annealing step of pressure annealing the disk blank; and a cutting and grinding step of cutting and grinding the pressure annealed disk blank. In the cold rolling step, a difference in rotational speed between upper and lower rollers is 5% or less and a rolling speed is 1000 m/min or less.

Advantageous Effects of Invention

The disclosure can provide an aluminium alloy substrate for a magnetic disk that can achieve preferable fluttering characteristics of the magnetic disk, a method of fabricating the substrate, and a magnetic disk composed of the aluminium alloy substrate for a magnetic disk.

DESCRIPTION OF EMBODIMENTS

Figure 1A:
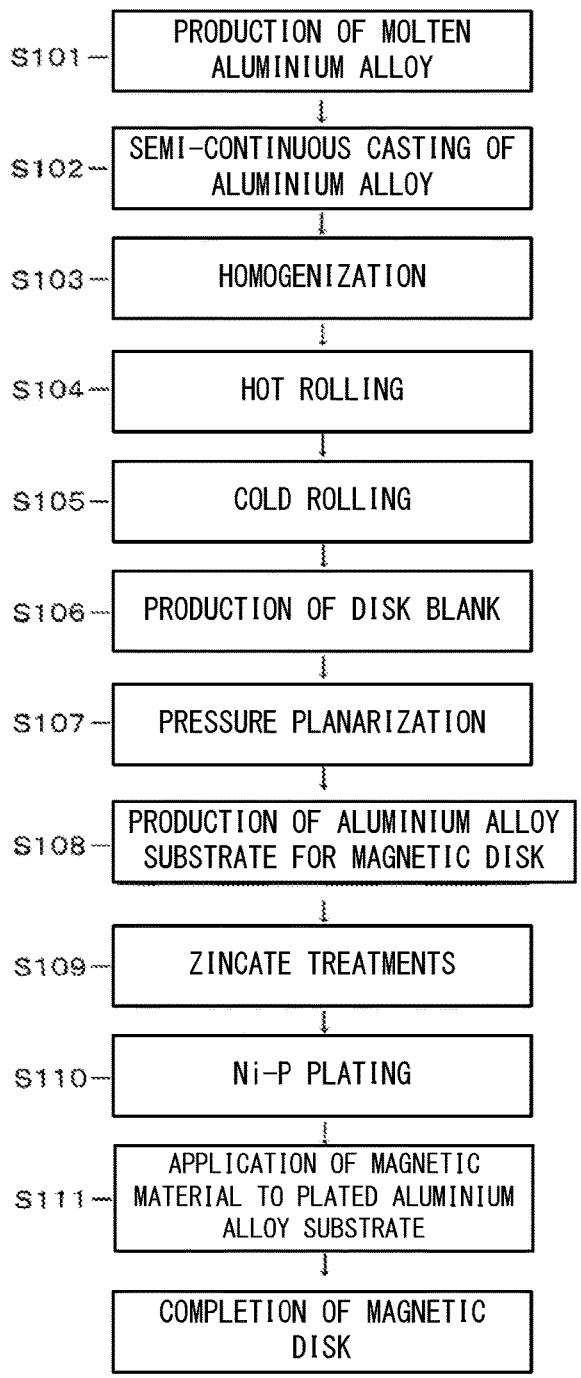
FIG. 1A is a flowchart illustrating a method of fabricating an aluminium alloy substrate for a magnetic disk and a magnetic disk according to the disclosure.

The present inventors have focused on the relationship between the fluttering characteristics of a substrate and materials thereof and carried out intensive studies on the relationship between the characteristics and the properties of the substrate (that constitutes a magnetic disk). As a result, the inventors have found that the fluttering characteristics are significantly affected by the Fe content of the substrate and the in-plane deviation of Young modulus in the substrate, and succeeded to improve the fluttering characteristics by adjusting the Young moduli to a predetermined range in the 0° direction, 45° direction, and 90° direction relative to the rolling direction. Specifically, the inventors have discovered that improved fluttering characteristics can be achieved by an aluminium alloy substrate for a magnetic disk that contains one or more elements selected from a group comprising 0.05 to 3.00 mass % (hereinafter abbreviated as "%") of Fe, 0.05% to 3.00% of Mn, 0.05% to 18.00% of Si, 0.05% to 8.00% of Ni, 0.05% to 3.00% of Cr, and 0.05% to 3.00% of Zr, and that has a Young modulus of 67 GPa or more in each of the 0° direction, 45° direction, and 90° direction relative to the rolling direction of the substrate. On the basis of these findings, the inventors have completed the disclosure.

A. Aluminium Alloy Substrate for a Magnetic Disk According to the Disclosure

An aluminium alloy substrate for a magnetic disk according to the disclosure (hereinafter abbreviated as "aluminium alloy substrate according to the disclosure" or simply as "aluminium alloy substrate") will now be described in detail.

1. Alloy Composition

The following description will focus on the constituent elements of an Al—Fe alloy, Al—Mn alloy, Al—Si alloy, Al—Ni alloy, Al—Cr alloy, or Al—Zr alloy contained in an aluminium alloy substrate for a magnetic disk according to the disclosure, and on the contents of these elements.

Fe:

Fe exists mainly in the form of second phase particles (for example, Al—Fe intermetallic compound particles) and partly in the form of a solid solution in the matrix, and has effects of improving the Young modulus, loss factor, and strength of the aluminium alloy substrate. The Fe content of the aluminium alloy of less than 0.05% cannot achieve a sufficient Young modulus. In contrast, the Fe content exceeding 3.00% results in generation of a large number of coarse Al—Fe intermetallic compound particles. The Al—Fe intermetallic compound particles cause a reduction in the grinding rate during a grinding process, leading to an increase in production costs, because these particles have higher hardness than the aluminium matrix and cannot be readily ground. In addition, these coarse Al—Fe intermetallic compound particles fall off during an etching process, zincate treatments, cutting process, or grinding process to yield large plating pits, thereby impairing the smoothness of the plated surface and causing peeling of the surface. This phenomenon also reduces the processability during a rolling process. For these reasons, the Fe content of the aluminium alloy is adjusted to the range of 0.05% to 3.00%. The Fe content is preferably in the range of 0.10% to 1.80%, and more preferably in the range of 0.20% to 1.50%.

Mn:

Mn exists mainly in the form of second phase particles (for example, Al—Mn intermetallic compound particles) and partly in the form of a solid solution in the matrix, and has effects of improving the Young modulus, loss factor, and strength of the aluminium alloy substrate. The Mn content of the aluminium alloy of less than 0.05% cannot achieve a sufficient Young modulus. In contrast, the Mn content exceeding 3.00% results in generation of a large number of coarse Al—Mn intermetallic compound particles. The Al—Mn intermetallic compound particles cause a reduction in the grinding rate during a grinding process, leading to an increase in production costs, because these particles have higher hardness than the aluminium matrix and cannot be readily ground. In addition, these coarse Al—Mn intermetallic compound particles fall off during an etching process, zincate treatments, cutting process, or grinding process to yield large plating pits, thereby impairing the smoothness of the plated surface and causing peeling of the surface. This phenomenon also reduces the processability during a rolling process. For these reasons, the Mn content of the aluminium alloy is adjusted to the range of 0.05% to 3.00%. The Mn content is preferably in the range of 0.10% to 1.80%, and more preferably in the range of 0.20% to 1.50%.

Si:

Si exists mainly in the form of second phase particles (for example, Si particles or Mg—Si intermetallic compound particles) and partly in the form of a solid solution in the matrix, and has effects of improving the Young modulus, loss factor, and strength of the aluminium alloy substrate. The Si content of the aluminium alloy of less than 0.05% cannot achieve a sufficient Young modulus. In contrast, the Si content exceeding 18.00% results in generation of a large number of coarse second phase particles. The second phase particles cause a reduction in the grinding rate during a grinding process, leading to an increase in production costs, because these particles have higher hardness than the aluminium matrix and cannot be readily ground. In addition, these coarse second phase particles fall off during an etching process, zincate treatments, cutting process, or grinding process to yield large plating pits, thereby impairing the smoothness of the plated surface and causing peeling of the surface. This phenomenon also reduces the processability during a rolling process. For these reasons, the Si content of the aluminium alloy is adjusted to the range of 0.05% to 18.00%. The Si content is preferably in the range of 0.10% to 15.00%, and more preferably in the range of 0.20% to 13.00%.

Ni:

Ni exists mainly in the form of second phase particles (for example, Al—Ni intermetallic compound particles) and partly in the form of a solid solution in the matrix, and has effects of improving the Young modulus, loss factor, and strength of the aluminium alloy substrate. The Ni content of the aluminium alloy of less than 0.05% cannot achieve a sufficient Young modulus. In contrast, the Ni content exceeding 8.00% results in generation of a large number of coarse Al—Ni intermetallic compound particles. The Al—Ni intermetallic compound particles cause a reduction in the grinding rate during a grinding process, leading to an increase in production costs, because these particles have higher hardness than the aluminium matrix and cannot be readily ground. In addition, these coarse Al—Ni intermetallic compound particles fall off during an etching process, zincate treatments, cutting process, or grinding process to yield large plating pits, thereby impairing the smoothness of the plated surface and causing peeling of the surface. This phenomenon also reduces the processability during a rolling process. For these reasons, the Ni content of the aluminium alloy is adjusted to the range of 0.05% to 8.00%. The Ni content is preferably in the range of 0.10% to 1.80%, and more preferably in the range of 0.20% to 1.50%.

Cr:

Cr exists mainly in the form of second phase particles (for example, Al—Cr intermetallic compound particles) and partly in the form of a solid solution in the matrix, and has effects of improving the Young modulus, loss factor, and strength of the aluminium alloy substrate. The Cr content of the aluminium alloy of less than 0.05% cannot achieve a sufficient Young modulus. In contrast, the Cr content exceeding 3.00% results in generation of a large number of coarse Al—Cr intermetallic compound particles. The Al—Cr intermetallic compound particles cause a reduction in the grinding rate during a grinding process, leading to an increase in production costs, because these particles have higher hardness than the aluminium matrix and cannot be readily ground. In addition, these coarse Al—Cr intermetallic compound particles fall off during an etching process, zincate treatments, cutting process, or grinding process to yield large plating pits, thereby impairing the smoothness of the plated surface and causing peeling of the surface. This phenomenon also reduces the processability during a rolling process. For these reasons, the Cr content of the aluminium alloy is adjusted to the range of 0.05% to 3.00%. The Cr content is preferably in the range of 0.10% to 1.80%, and more preferably in the range of 0.20% to 1.50%.

Zr:

Zr exists mainly in the form of second phase particles (for example, Al—Zr intermetallic compound particles) and partly in the form of a solid solution in the matrix, and has effects of improving the Young modulus, loss factor, and strength of the aluminium alloy substrate. The Zr content of the aluminium alloy of less than 0.05% cannot achieve a sufficient Young modulus. In contrast, the Zr content exceeding 3.00% results in generation of a large number of coarse Al—Zr intermetallic compound particles. The Al—Zr intermetallic compound particles cause a reduction in the grinding rate during a grinding process, leading to an increase in production costs, because these particles have higher hardness than the aluminium matrix and cannot be readily ground. In addition, these coarse Al—Zr intermetallic compound particles fall off during an etching process, zincate treatments, cutting process, or grinding process to yield large plating pits, thereby impairing the smoothness of the plated surface and causing peeling of the surface. This phenomenon also reduces the processability during a rolling process. For these reasons, the Zr content of the aluminium alloy is adjusted to the range of 0.05% to 3.00%. The Zr content is preferably in the range of 0.10% to 1.80%, and more preferably in the range of 0.20% to 1.50%.

In order to further improve the fluttering characteristics, strength, and plating characteristics of the aluminium alloy substrate for a magnetic disk, the substrate may further contain 0.003% to 8.000% of Cu as a first optional element. The substrate may further contain one or two second optional elements selected from a group comprising 0.05% to 0.90% of Mg and 0.005 to 8.000 mass % of Zn. The substrate may further contain one or more third optional elements selected from a group comprising Ti, B, and V at a total content of 0.005% to 0.500%. These optional elements will now be described.

Cu:

Cu exists mainly in the form of second phase particles (for example, Al—Cu intermetallic compound particles), and has effects of improving the Young modulus and strength of the aluminium alloy substrate. Cu also reduces the amount of dissolved Al during zincate treatments. Furthermore, Cu has effects of applying a zincate coating in a uniform, thin, and dense manner to improve the smoothness during the subsequent plating process. The Cu content of the aluminium alloy of 0.003% or more can further enhance the effects of improving the Young modulus and strength of the aluminium alloy substrate and the effects of improving the smoothness. The Cu content of the aluminium alloy of 8.000% or less can prevent generation of a large number of coarse Al—Cu intermetallic compound particles, thereby further suppressing an increase in production costs, which is caused by a reduction in grinding rate due to generation of a large number of intermetallic compound particles. This Cu content can also prevent these coarse Al—Cu intermetallic compound particles from falling off during an etching process, zincate treatments, cutting process, or grinding process and thereby yielding large pits, so as to further enhance the effects of improving the smoothness of the plated surface. This Cu content can further inhibit peeling of the plated surface. In addition, this Cu content can further prevent a reduction in processability during a rolling process. For these reasons, the Cu content of the aluminium alloy is preferably in the range of 0.003% to 8.000%, and more preferably in the range of 0.005% to 0.900%.

Mg:

Mg has effects of applying a zincate coating in a uniform, thin, and dense manner during zincate treatments and thereby improving the smoothness and adhesion of the Ni—P plated surface during the base plating process subsequent to the zincate treatments. The Mg content of the aluminium alloy of 0.05% or more can further enhance the effects of applying a zincate coating in a uniform, thin, and dense manner and improving the smoothness of the plated surface. The Mg content of the aluminium alloy of 0.90% or less can yield a uniform zincate coating and further prevent impairment of the smoothness of the plated surface. This Mg content can also suppress a reduction in Young modulus or loss factor. For these reasons, the Mg content of the aluminium alloy is preferably in the range of 0.05% to 0.90%, and more preferably in the range of 0.05% to 0.50%.

Zn:

Zn has effects of reducing the amount of dissolved Al during zincate treatments, applying a zincate coating in a uniform, thin, and dense manner during the zincate treatments, and improving the smoothness and adhesion during the subsequent plating process. Zn forms second phase particles with other added elements and improves the Young modulus and strength. The Zn content of the aluminium alloy of 0.005% or more can further enhance the effects of reducing the amount of dissolved Al during zincate treatments, applying a zincate coating in a uniform, thin, and dense manner, and improving the smoothness of the plated surface. The Zn content of the aluminium alloy of 8.000% or less can yield a uniform zincate coating and further prevent impairment of the smoothness of the plated surface. This Zn content can further inhibit peeling of the plated surface. In addition, this Zn content can further prevent a reduction in processability during a rolling process. For these reasons, the Zn content of the aluminium alloy is preferably in the range of 0.005% to 8.000%, and more preferably in the range of 0.100% to 0.900%.

Ti, B, V

Ti, B, and V form second phase particles (for example, particles of boride, such as $TiB_2$, or $Al_3Ti$ or Ti-V-B) during a solidification process of casting, which serve as nuclei of crystal grains, and can thus produce finer crystal grains, leading to an improvement in plating characteristics. These finer crystal grains contribute to an increase in uniformity of the sizes of the second phase particles and a decrease in variation of the strength and fluttering characteristics of the magnetic disk. These effects, however, cannot be achieved by Ti, B, and V at a total content of less than 0.005%. In contrast, the effects are saturated and not significantly enhanced even if the total content of Ti, B, and V exceeds 0.500%. For these reasons, if Ti, B, or V is added, the total content of Ti, B, and V is preferably in the range of 0.005% to 0.500%, and more preferably in the range of 0.005% to 0.100%. It should be noted that the total amount indicates the amount of any one element of Ti, B, and V for the alloy containing only this element, the sum of the amounts of any two elements for the alloy containing these two elements, and the sum of the amounts of three elements for the alloy containing all the three elements.

Other Elements:

The balance of the aluminum alloy base material according to the embodiment of the present disclosure consists of Al and unavoidable impurities. Examples of the unavoidable contaminants include Ga and Sn. If the content of each contaminant is less than 0.05% and if the total content is less than 0.10%, the contaminants do not impair the characteristics of the aluminium alloy substrate according to the disclosure.

2. Young Modulus of the Aluminium Alloy Substrate

The Young modulus of the aluminium alloy substrate will now be described.

In the aluminium alloy substrate according to the disclosure, the Young moduli in the 0° direction, 45° direction, and 90° direction relative to the rolling direction of the substrate is defined to be 67 GPa or more.

The improved fluttering characteristics are achieved by Young moduli of 67 GPa or more in the 0° direction, 45° direction, and 90° direction relative to the rolling direction in the aluminium alloy substrate according to the disclosure. The Young moduli of the aluminium alloy substrate can therefore be used as an index indicating the magnitude of the effects of improving the fluttering characteristics for convenience.

Higher Young moduli of the aluminium alloy substrate contribute to an increase in rigidity of the substrate, a reduction in exciting force, and an improvement in fluttering characteristics. The substrate, however, has various Young moduli in different directions. That is, sufficient fluttering characteristics cannot be achieved by only an increase in Young modulus in a certain direction and require increases in Young moduli in all the directions. In general, the direction providing the maximum Young modulus and the direction providing the minimum Young modulus correspond to any of the 0° direction, 45° direction, and 90° direction relative to the rolling direction. Accordingly, the substrate having a Young modulus of less than 67 GPa in one or two directions of the 0° direction, 45° direction, and 90° direction relative to the rolling direction cannot achieve sufficient fluttering characteristics. All the Young moduli in the 0° direction, 45° direction, and 90° direction relative to the rolling direction of the substrate are therefore defined to be 67 GPa or more. Preferably, the Young moduli in the 0° direction, 45° direction, and 90° direction relative to the rolling direction of the substrate is 69 GPa or more. The upper limit of the Young moduli is not particularly limited and consequentially determined depending on the alloy composition and fabrication method. According to the disclosure, the upper limit is approximately 85 GPa.

3. Product of the Loss Factor and the Thickness (Mm) of the Substrate

A product of the loss factor (−) and the thickness (mm) of the aluminium alloy substrate is preferably $0.7 \times 10^{-3}$ mm or more in each of the 0° direction, 45° direction, and 90° direction relative to the rolling direction. The aluminium alloy substrate having a larger thickness has a higher rigidity and can achieve improved fluttering characteristics. As the loss factors in the 0° direction, 45° direction, and 90° direction relative to the rolling direction increase, the aluminium alloy substrate can more rapidly attenuate vibration and thus achieve improved fluttering characteristics. The product of the loss factor and the thickness (mm) of the aluminium alloy substrate can therefore be used as an index indicating the magnitude of the effects of improving the fluttering characteristics for convenience.

The product of the loss factor (−) and the thickness (mm) of the aluminium alloy substrate is preferably $0.7 \times 10^{-3}$ mm or more, more preferably $0.8 \times 10^{-3}$ mm or more, and still more preferably $0.9 \times 10^{-3}$ mm or more in each of the 0° direction, 45° direction, and 90° direction relative to the rolling direction. This feature can more effectively improve the fluttering characteristics. The product of the loss factor and the thickness (mm) has no upper limit in view of obtaining the above-described effects. In the aluminium alloy substrate containing the above-described chemical composition, the product of the loss factor and the thickness (mm) is $10.0 \times 10^{-3}$ mm or less, in general.

The loss factor indicates a value calculated by dividing the natural logarithm of the ratio of the amplitudes of the adjacent waves of attenuating free vibration by π. The loss factor is represented by $\{(1/m) \times \ln(a_n/a_{n+m})\}/\pi$, where $a_n$ is the nth amplitude, and $a_{n+1}, \ldots, a_{n+m}$ are respectively the (n+1)th, …, (n+m)th amplitudes at a time $t_n$.

4. Fluttering Characteristics

The fluttering characteristics will now be described. The fluttering characteristics are also affected by the motor characteristics of a hard disk drive. According to the disclosure, the level of fluttering characteristics is preferably 30 nm or less and more preferably 10 nm or less in the air. The level of fluttering characteristics of 30 nm or less is determined to be sufficient for use in a general HDD. The level of fluttering characteristics exceeding 30 nm increases the frequency of errors in positioning of the head, which is a reading unit.

Necessary fluttering characteristics differ depending on the type of the applied hard disk drive and can be used to appropriately determine the distribution of intermetallic compound particles. The necessary fluttering characteristics can be obtained by properly adjusting the contents of the added elements (described above), the conditions of the casting method including a cooling rate during casting (described below), and thermal and processing histories caused by the subsequent steps of heating and processing.

According to an embodiment of the disclosure, the aluminium alloy substrate preferably has a thickness of 0.35 mm or more. An aluminium alloy substrate having a thickness of less than 0.35 mm may be deformed by an accelerating force caused by, for example, falling during installation of the hard disk drive. This limitation can be eliminated if the substrate has a sufficient strength so as not be deformed. An aluminium alloy substrate having a thickness exceeding 1.80 mm can achieve improved fluttering characteristics, but is not preferable because the number of disks installable in the hard disk drive is reduced. Accordingly, the thickness of the aluminium alloy substrate is more preferably in the range of 0.35 to 1.80 mm, and still more preferably in the range of 0.50 to 1.30 mm.

Filling the hard disk drive with helium can reduce the fluid force, because helium has a lower gas viscosity than the air, which is approximately an eighth of the gas viscosity of the air. The reduction in fluid force can decrease the disk flutters caused by gas flows accompanying rotation of hard disks.

B. Method of Fabricating the Aluminium Alloy Substrate According to the Disclosure A method of fabricating the aluminium alloy substrate according to the disclosure will now be explained in detail regarding the respective steps and processing conditions.

Figure 1B:
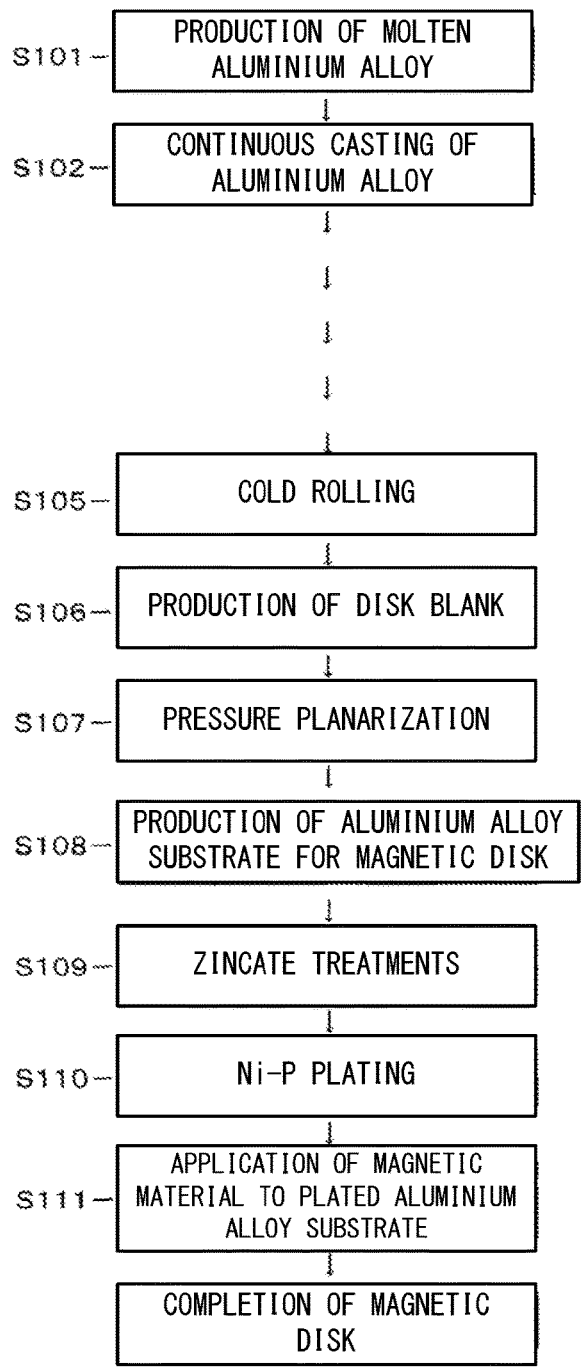
FIG. 1B is a flowchart illustrating a method of fabricating an aluminium alloy substrate for a magnetic disk and a magnetic disk according to the disclosure.

A method of fabricating a magnetic disk composed of an aluminium alloy substrate will be explained in accordance with flowcharts of FIG. 1A and FIG. 1B. In FIG. 1A and FIG. 1B, the steps from the production of a molten aluminium alloy (Step S101) to the cold rolling (Step S105) in FIG. 1A and the steps of the production of a molten aluminium alloy (Step S101), the continuous casting of the aluminium alloy (Step S102), and the cold rolling (Step S105) in FIG. 1B correspond to the steps of fabricating an aluminum alloy plate. The steps from the production of a disk blank (Step S106) to the application of a magnetic material to the plated aluminium alloy substrate (Step S111) correspond to the steps of converting the aluminium alloy plate into a magnetic disk.

First, the steps of fabricating an aluminium alloy plate will be explained. An aluminium alloy having the above-described composition is heated and melted into a molten aluminium alloy by a general method (Step S101). This molten aluminium alloy is then cast to prepare an aluminium alloy ingot by a semi-continuous casting (DC casting) method or a continuous casting (CC) method (Step S102). The following explanation focuses on the DC casting method and the CC method.

In the DC casting method, a molten metal is casted through a spout and is cooled by a bottom block, the wall of a water-cooled mold, and cooling water directly ejected to the circumference of an ingot. The metal is solidified and then extracted downward in the form of an ingot.

In the CC method, a molten metal is supplied between a pair of rollers (alternatively, belt casters or block casters) through a casting nozzle, and is cooled by the rollers, to directly cast a thin plate.

The primary difference between the DC casting method and the CC method is their cooling rates during casting. The CC method having a high cooling rate provides second phase particles smaller than those in the DC casting method.

As illustrated in FIG. 1A, the aluminium alloy ingot prepared by the DC casting method is subject to homogenization as required (Step S103). If the homogenization is conducted, the ingot is heated preferably at a temperature of 280° C. to 620° C. and for a period of 0.5 to 60 hours, and more preferably at a temperature of 300° C. to 620° C. and for a period of 1 to 24 hours. If the heating temperature is less than 280° C. or if the heating period is less than 0.5 hours in homogenization, aluminium alloy substrates are not sufficiently homogenized and may have a large variation in attenuation ratio, resulting in a large variation in fluttering characteristics. At a heating temperature exceeding 620° C. in homogenization, an aluminium alloy ingot may be melted. The effects are saturated and not significantly enhanced even if the heating period in homogenization exceeds 60 hours.

The aluminium alloy ingot, which is prepared by the DC casting method and is subject to or not subject to homogenization as required, is then hot rolled to produce a plate (Step S104 in FIG. 1A). Although the conditions of the hot rolling are not particularly limited, the temperature at the start of hot rolling is preferably in the range of 250° C. to 600° C. and the temperature at the end of hot rolling is preferably in the range of 230° C. to 450° C.

Then, the hot rolled plate made of the ingot prepared by the DC casting method or the plate casted by the CC method is cold rolled to produce an aluminium alloy plate having a thickness of approximately 1.8 to 0.35 mm (Step S105). This cold rolling process causes the plate to have a thickness required as a final product.

The difference in rotational speed between the upper and lower rollers that come into contact with the plate in the cold rolling process is defined to be 5% or less. The difference in rotational speed between the upper and lower rollers is represented by $\{(r_{max}-r_{min})/r_{ave}\}\times 100$ (%), where $r_{max}$ is the maximum rotational speed of one of the upper and lower rollers having a higher rotational speed, $r_{min}$ is the minimum rotational speed of the other roller having a lower rotational speed, and $r_{ave}$ is the average rotational speed of the two rollers. The difference in rotational speed exceeding 5% leads to a high degree of anisotropy of the crystal structure. An aluminium alloy has various Young moduli in different directions of the crystal structure, and the high degree of anisotropy indicates that the aluminium alloy has a high Young modulus in one direction and a low Young modulus in another direction. The difference in rotational speed between the upper and lower rollers is therefore defined to be 5% or less. The difference in rotational speed is preferably 3% or less, and more preferably 0%.

The rolling speed in the cold rolling process is defined to be 1000 m/min or less. The rolling speed exceeding 1000 m/min leads to a high degree of anisotropy of the crystal structure. An aluminium alloy has various Young moduli in different directions of the crystal structure, and the high degree of anisotropy indicates that the aluminium alloy has a high Young modulus in one direction and a low Young modulus in another direction. The rolling speed in the cold rolling process is preferably 500 m/min or less. Although the lower limit of the rolling speed in the cold rolling process is not particularly limited, the rolling speed of less than 5 m/min results in a significant reduction in productivity and therefore is not preferable.

The reduction ratio of the cold rolling is not particularly limited and can be determined depending on a strength or thickness required as a final product. The reduction ratio is preferably 10% to 95%. The aluminium alloy plate may be annealed before or during the cold rolling process to secure cold rolling processability. If the annealing is conducted, for example, the plate is preferably heated in a batch manner at a temperature of 300° C. to 500° C. for a period of 0.1 to 30 hours, or in a continuous manner at a temperature of 400° C. to 600° C. for a retention time of 0 to 60 seconds. The retention time of 0 seconds indicates that the plate is cooled immediately after reaching a desired retention temperature.

Next, the steps of converting the aluminium alloy plate fabricated as explained above into a magnetic disk will be explained. In order to prepare the aluminium alloy plate for application to a magnetic disk, the aluminium alloy plate is punched to prepare a disk blank having an annular shape (Step S106). This disk blank is then subject to pressure annealing in the air, for example, at a temperature of 100° C. to 380° C. for a period of 30 minutes or more, to produce a flattened blank (Step S107). This blank is then subject to a cutting process, a grinding process, and a stress relieving heat treatment, preferably at a temperature of 250° C. to 400° C. for a period of 5 to 15 minutes, in the order mentioned, to produce an aluminium alloy substrate (Step S108). These processes can yield an aluminium alloy substrate according to the disclosure.

Then, the surface of the aluminium alloy substrate is subject to a degreasing process, an acid etching process, and a desmutting treatment, and is then undergo zincate treatments (Zn substitution)(Step S109).

The degreasing process is conducted using a commercially available degreasing solution, such as AD-68F (manufactured by C.Uyemura & Co., Ltd.), preferably at a temperature of 40° C. to 70° C. for a treatment period of 3 to 10 minutes at a concentration of 200 to 800 mL/L. The acid etching process is performed using a commercially available etchant, such as AD-107F (manufactured by C.Uyemura & Co., Ltd.), preferably at a temperature of 50° C. to 75° C. for a treatment period of 0.5 to 5 minutes at a concentration of 20 to 100 mL/L. If the acid etching process is followed by compound removal, a typical desmutting treatment is conducted using $HNO_3$, preferably at a temperature of 15° C. to 40° C. for a treatment period of 10 to 120 seconds at a concentration of 10% to 60%. If the acid etching process is not followed by compound removal, the compound removal may be performed instead of or in addition to the desmutting treatment.

A first zincate treatment is conducted using a commercially available zincate solution, such as AD-301F-3X (manufactured by C.Uyemura & Co., Ltd.), preferably at a temperature of 10° C. to 35° C. for a treatment period of 0.1 to 5 minutes at a concentration of 100 to 500 mL/L. The first zincate treatment is preferably followed by a Zn peeling process using $HNO_3$ at a temperature of 15° C. to 40° C. for a treatment period of 10 to 120 seconds at a concentration of 10% to 60%. A second zincate treatment is then conducted under the same conditions as the first zincate treatment.

The surface of the aluminium alloy substrate after the second zincate treatment is provided with electroless Ni—P plating as base plating (Step S110 in FIG. 1A and FIG. 1B). The electroless Ni—P plating is conducted using a commercially available plating solution, such as NIMUDEN HDX (manufactured by C.Uyemura & Co., Ltd.), preferably at a temperature of 80° C. to 95° C. for a treatment period of 30 to 180 minutes at a Ni concentration of 3 to 10 g/L. This electroless Ni—P plating process can yield a base-plated aluminium alloy substrate for a magnetic disk.

C. Magnetic Disk

In the last step, the base-plated surface of the plated aluminium alloy substrate for a magnetic disk is smoothed by grinding and is provided with a magnetic medium containing a foundation layer, a magnetic layer, a protective film, and a lubricating layer, by spattering to thereby complete a magnetic disk according to the disclosure (Step S111).

It should be noted that the distribution and composition of the elements do not vary after fabrication of the aluminium alloy plate (Step S105), because the steps after Step S105 do not cause a variation in structure unlike the cold rolling process. Accordingly, the distribution, composition, and the like, of the elements may also be evaluated based on the aluminium alloy plate (Step S105), the disk blank (Step S106), the plated aluminium alloy substrate (Step S110), or the magnetic disk (Step S111), instead of the aluminium alloy substrate (Step S108).

EXAMPLES

Examples of the disclosure will now be described in more detail but should not be construed as limiting the disclosure.

Aluminium alloy substrates according to the examples will be described. Alloy materials containing the constituent elements shown in Tables 1 to 3 were dissolved in accordance with a general procedure to produce molten aluminium alloys (Step S101). Each of the symbols "–" in Tables 1 to 3 indicates a value less than the measurable threshold.

TABLE 1

| ALLOY No. | CONSTITUENT ELEMENTS (mass %) | | | | | | | | | | | | Ti + B + V | Al + UNAVOIDABLE IMPURITIES |
|---|---|---|---|---|---|---|---|---|---|---|---|---|---|---|
| | Fe | Mn | Si | Ni | Cr | Zr | Cu | Mg | Zn | Ti | B | V | | |
| A1  | 0.05 | —   | —    | —   | —   | —   | —     | — | — | — | — | — | 0.000 | Bal. |
| A2  | 0.10 | —   | —    | —   | —   | —   | 0.015 | — | — | — | — | — | 0.000 | Bal. |
| A3  | 0.40 | —   | —    | —   | —   | —   | 0.015 | — | — | — | — | — | 0.000 | Bal. |
| A4  | 1.70 | —   | —    | —   | —   | —   | 0.015 | — | — | — | — | — | 0.000 | Bal. |
| A5  | 2.90 | —   | —    | —   | —   | —   | 0.015 | — | — | — | — | — | 0.000 | Bal. |
| A6  | —    | 0.05 | —   | —   | —   | —   | —     | — | — | — | — | — | 0.000 | Bal. |
| A7  | —    | 0.10 | —   | —   | —   | —   | 0.015 | — | — | — | — | — | 0.000 | Bal. |
| A8  | —    | 0.40 | —   | —   | —   | —   | 0.015 | — | — | — | — | — | 0.000 | Bal. |
| A9  | —    | 1.70 | —   | —   | —   | —   | 0.015 | — | — | — | — | — | 0.000 | Bal. |
| A10 | —    | 2.90 | —   | —   | —   | —   | 0.015 | — | — | — | — | — | 0.000 | Bal. |
| A11 | —    | —   | 0.05  | —   | —   | —   | —     | — | — | — | — | — | 0.000 | Bal. |
| A12 | —    | —   | 0.40  | —   | —   | —   | 0.015 | — | — | — | — | — | 0.000 | Bal. |
| A13 | —    | —   | 5.00  | —   | —   | —   | 0.015 | — | — | — | — | — | 0.000 | Bal. |
| A14 | —    | —   | 13.00 | —   | —   | —   | 0.015 | — | — | — | — | — | 0.000 | Bal. |
| A15 | —    | —   | 17.50 | —   | —   | —   | 0.015 | — | — | — | — | — | 0.000 | Bal. |
| A16 | —    | —   | —    | 0.05 | —   | —   | —     | — | — | — | — | — | 0.000 | Bal. |
| A17 | —    | —   | —    | 0.10 | —   | —   | 0.015 | — | — | — | — | — | 0.000 | Bal. |
| A18 | —    | —   | —    | 0.40 | —   | —   | 0.015 | — | — | — | — | — | 0.000 | Bal. |
| A19 | —    | —   | —    | 1.70 | —   | —   | 0.015 | — | — | — | — | — | 0.000 | Bal. |
| A20 | —    | —   | —    | 7.50 | —   | —   | 0.015 | — | — | — | — | — | 0.000 | Bal. |
| A21 | —    | —   | —    | —   | 0.05 | —   | —     | — | — | — | — | — | 0.000 | Bal. |
| A22 | —    | —   | —    | —   | 0.10 | —   | 0.015 | — | — | — | — | — | 0.000 | Bal. |
| A23 | —    | —   | —    | —   | 0.40 | —   | 0.015 | — | — | — | — | — | 0.000 | Bal. |
| A24 | —    | —   | —    | —   | 1.70 | —   | 0.015 | — | — | — | — | — | 0.000 | Bal. |
| A25 | —    | —   | —    | —   | 2.90 | —   | 0.015 | — | — | — | — | — | 0.000 | Bal. |
| A26 | —    | —   | —    | —   | —   | 0.05 | —     | — | — | — | — | — | 0.000 | Bal. |
| A27 | —    | —   | —    | —   | —   | 0.10 | 0.015 | — | — | — | — | — | 0.000 | Bal. |
| A28 | —    | —   | —    | —   | —   | 0.40 | 0.015 | — | — | — | — | — | 0.000 | Bal. |
| A29 | —    | —   | —    | —   | —   | 1.70 | 0.015 | — | — | — | — | — | 0.000 | Bal. |
| A30 | —    | —   | —    | —   | —   | 2.90 | 0.015 | — | — | — | — | — | 0.000 | Bal. |

TABLE 2

| ALLOY No. | CONSTITUENT ELEMENTS (mass %) | | | | | | | | | | | | Ti + B + V | Al + UNAVOIDABLE IMPURITIES |
|---|---|---|---|---|---|---|---|---|---|---|---|---|---|---|
| | Fe | Mn | Si | Ni | Cr | Zr | Cu | Mg | Zn | Ti | B | V | | |
| A31 | 1.00 | 0.50 | —   | —   | —   | —   | 0.003 | —     | —     | —     | —     | —     | 0.000 | Bal. |
| A32 | 1.00 | —   | 0.50 | —   | —   | —   | 0.895 | —     | —     | —     | —     | —     | 0.000 | Bal. |
| A33 | 1.00 | —   | —   | 0.50 | —   | —   | 7.505 | —     | —     | —     | —     | —     | 0.000 | Bal. |
| A34 | 1.00 | —   | —   | —   | 0.50 | —   | —     | 0.05  | —     | —     | —     | —     | 0.000 | Bal. |
| A35 | 1.00 | —   | —   | —   | —   | 0.50 | —    | 0.45  | —     | —     | —     | —     | 0.000 | Bal. |
| A36 | 1.00 | 1.00 | 0.50 | 0.50 | 0.50 | 0.50 | —   | 0.85  | —     | —     | —     | —     | 0.000 | Bal. |
| A37 | 0.50 | 1.00 | 3.00 | 0.50 | 0.50 | 0.50 | —   | —     | 0.005 | —     | —     | —     | 0.000 | Bal. |
| A38 | 0.50 | 0.50 | 0.50 | 1.00 | 0.50 | 0.50 | —   | —     | 0.350 | —     | —     | —     | 0.000 | Bal. |
| A39 | 0.50 | 0.50 | 0.50 | 0.50 | 1.00 | 0.50 | 0.015 | — | 0.950 | —     | —     | —     | 0.000 | Bal. |
| A40 | 0.50 | 0.50 | 0.50 | 0.50 | 0.50 | 1.00 | 0.015 | — | —     | 0.010 | —     | —     | 0.010 | Bal. |
| A41 | 0.50 | 0.50 | 0.50 | 0.50 | 0.50 | 0.50 | 0.015 | — | —     | 0.390 | —     | —     | 0.390 | Bal. |
| A42 | 0.50 | 0.50 | 0.50 | 0.50 | 0.50 | 0.50 | 0.015 | — | —     | —     | 0.010 | —     | 0.010 | Bal. |
| A43 | 0.50 | 0.50 | 0.50 | 0.50 | 0.50 | 0.50 | 0.015 | — | —     | —     | 0.351 | —     | 0.351 | Bal. |
| A44 | 0.50 | 0.50 | 0.50 | 0.50 | 0.50 | 0.50 | 0.015 | — | —     | 0.050 | —     | —     | 0.050 | Bal. |

TABLE 2-continued

CONSTITUENT ELEMENTS (mass %)

| ALLOY No. | Fe | Mn | Si | Ni | Cr | Zr | Cu | Mg | Zn | Ti | B | V | Ti + B + V | Al + UNAVOIDABLE IMPURITIES |
|---|---|---|---|---|---|---|---|---|---|---|---|---|---|---|
| A45 | 0.50 | 0.50 | 0.50 | 0.50 | 0.50 | 0.50 | 0.015 | — | — | 0.231 | — | 0.210 | 0.441 | Bal. |
| A46 | 0.50 | 0.50 | 0.50 | 0.50 | 0.50 | 0.50 | 0.015 | — | — | 0.010 | 0.001 | 0.010 | 0.021 | Bal. |
| A47 | 0.50 | 0.50 | 0.50 | 0.50 | 0.50 | 0.50 | 0.015 | — | — | 0.100 | 0.010 | 0.080 | 0.190 | Bal. |
| A48 | 0.50 | 0.50 | 0.50 | 0.50 | 0.50 | 0.50 | 0.015 | — | — | 0.250 | 0.020 | 0.150 | 0.420 | Bal. |
| A49 | 0.50 | 0.50 | 0.50 | 0.50 | 0.50 | 0.50 | 0.015 | — | — | — | — | — | 0.000 | Bal. |
| A50 | 0.50 | 0.50 | 0.50 | 0.50 | 0.50 | 0.50 | 0.015 | — | — | — | — | — | 0.000 | Bal. |
| A51 | 0.50 | 0.50 | 0.50 | 0.50 | 0.50 | 0.50 | 0.015 | — | — | — | — | — | 0.000 | Bal. |

TABLE 3

CONSTITUENT ELEMENTS (mass %)

| ALLOY No. | Fe | Mn | Si | Ni | Cr | Zr | Cu | Mg | Zn | Ti | B | V | Ti + B + V | Al + UNAVOIDABLE IMPURITIES |
|---|---|---|---|---|---|---|---|---|---|---|---|---|---|---|
| AC1 | 0.02 | — | — | — | — | — | — | — | — | — | — | — | 0.000 | Bal. |
| AC2 | — | 0.02 | — | — | — | — | — | — | — | — | — | — | 0.000 | Bal. |
| AC3 | — | — | 0.02 | — | — | — | — | — | — | — | — | — | 0.000 | Bal. |
| AC4 | — | — | — | 0.02 | — | — | — | — | — | — | — | — | 0.000 | Bal. |
| AC5 | — | — | — | — | 0.02 | — | — | — | — | — | — | — | 0.000 | Bal. |
| AC6 | — | — | — | — | — | 0.02 | — | — | — | — | — | — | 0.000 | Bal. |
| AC7 | — | — | — | — | — | — | 10.550 | — | — | — | — | — | 0.000 | Bal. |
| AC8 | — | — | — | — | — | — | — | 2.00 | — | — | — | — | 0.000 | Bal. |
| AC9 | — | — | — | — | — | — | — | — | 10.150 | — | — | — | 0.000 | Bal. |
| AC10 | 3.50 | — | — | — | — | — | — | — | — | — | — | — | 0.000 | Bal. |
| AC11 | — | 3.50 | — | — | — | — | — | — | — | — | — | — | 0.000 | Bal. |
| AC12 | — | — | 20.50 | — | — | — | — | — | — | — | — | — | 0.000 | Bal. |
| AC13 | — | — | — | 10.50 | — | — | — | — | — | — | — | — | 0.000 | Bal. |
| AC14 | — | — | — | — | 3.50 | — | — | — | — | — | — | — | 0.000 | Bal. |
| AC15 | — | — | — | — | — | 3.50 | — | — | — | — | — | — | 0.000 | Bal. |
| AC16 | 1.00 | 0.50 | 0.10 | 0.10 | 0.10 | 0.10 | 0.015 | — | — | — | — | — | 0.000 | Bal. |
| AC17 | 0.50 | 1.00 | 0.10 | 0.10 | 0.10 | 0.10 | 0.015 | — | — | — | — | — | 0.000 | Bal. |
| AC18 | 0.60 | 0.60 | — | 1.10 | — | — | 0.015 | — | — | — | — | — | 0.000 | Bal. |
| AC19 | 0.10 | 0.10 | 6.00 | 0.10 | 0.10 | 0.10 | 0.015 | — | — | — | — | — | 0.000 | Bal. |
| AC20 | 0.10 | — | — | — | — | — | — | 1.50 | — | — | — | — | 0.000 | Bal. |
| AC21 | 0.50 | 1.00 | 0.10 | 0.10 | 0.10 | 0.10 | 0.015 | — | — | — | — | — | 0.000 | Bal. |
| AC22 | 0.50 | 1.00 | 0.10 | 0.10 | 0.10 | 0.10 | 0.015 | — | — | — | — | — | 0.000 | Bal. |
| AC23 | 0.50 | 1.00 | 0.10 | 0.10 | 0.10 | 0.10 | 0.015 | — | — | — | — | — | 0.000 | Bal. |

The molten aluminium alloys, other than the alloys No. A40 to A42 and A49 to A51 and No. AC16 ad AC21 to AC23, were then casted by a DC casting method under the respective conditions shown in Tables 4 to 6 to produce ingots having a thickness of 200 mm. Both surfaces of the ingots were shaved by 10 mm (Step S102 FIG. 1A). In contrast, the molten aluminium alloys No. A40 to A42 and A49 to A51 and No. AC16 and AC21 to AC23 were casted by a CC method to produce cast plates having a thickness of 8 mm (Step S102 in FIG. 1B). The alloys, other than the alloys No. A3 to A5 and A40 to A42 and No. AC16, were then homogenized at 380° C. for two hours (Step S103 in FIG. 1A). The alloys, other than the alloys No. A40 to A42 and A49 to A51 and No. AC16 and AC21 to AC23, were then hot rolled under the conditions of a temperature at the start of hot rolling of 380° C. and a temperature at the end of hot rolling of 300° C. This process yielded hot rolled plates having a thickness of 3 mm (Step S104 in FIG. 1A).

TABLE 4

COLD ROLLING CONDITIONS

| | ALLOY No. | DIFFERENCE IN ROTATIONAL SPEED BETWEEN UPPER AND LOWER ROLLERS (%) | ROLLING SPEED (m/min) |
|---|---|---|---|
| EXAMPLE 1 | A1 | 0 | 900 |
| EXAMPLE 2 | A2 | 0 | 500 |
| EXAMPLE 3 | A3 | 0 | 300 |
| EXAMPLE 4 | A4 | 0 | 100 |
| EXAMPLE 5 | A5 | 0 | 50 |
| EXAMPLE 6 | A6 | 4 | 5 |
| EXAMPLE 7 | A7 | 3 | 10 |
| EXAMPLE 8 | A8 | 2 | 30 |
| EXAMPLE 9 | A9 | 0 | 30 |
| EXAMPLE 10 | A10 | 0 | 30 |
| EXAMPLE 11 | A11 | 0 | 30 |
| EXAMPLE 12 | A12 | 0 | 30 |

TABLE 4-continued

COLD ROLLING CONDITIONS

| | ALLOY No. | DIFFERENCE IN ROTATIONAL SPEED BETWEEN UPPER AND LOWER ROLLERS (%) | ROLLING SPEED (m/min) |
|---|---|---|---|
| EXAMPLE 13 | A13 | 0 | 30 |
| EXAMPLE 14 | A14 | 1 | 30 |
| EXAMPLE 15 | A15 | 0 | 30 |
| EXAMPLE 16 | A16 | 0 | 30 |
| EXAMPLE 17 | A17 | 1 | 30 |
| EXAMPLE 18 | A18 | 0 | 30 |
| EXAMPLE 19 | A19 | 0 | 30 |
| EXAMPLE 20 | A20 | 0 | 30 |
| EXAMPLE 21 | A21 | 1 | 30 |
| EXAMPLE 22 | A22 | 0 | 30 |
| EXAMPLE 23 | A23 | 0 | 30 |
| EXAMPLE 24 | A24 | 0 | 30 |
| EXAMPLE 25 | A25 | 0 | 30 |
| EXAMPLE 26 | A26 | 0 | 30 |
| EXAMPLE 27 | A27 | 0 | 30 |
| EXAMPLE 28 | A28 | 0 | 30 |
| EXAMPLE 29 | A29 | 0 | 30 |
| EXAMPLE 30 | A30 | 0 | 30 |

TABLE 5

COLD ROLLING CONDITIONS

| | ALLOY No. | DIFFERENCE IN ROTATIONAL SPEED BETWEEN UPPER AND LOWER ROLLERS (%) | ROLLING SPEED (m/min) |
|---|---|---|---|
| EXAMPLE 31 | A31 | 0 | 30 |
| EXAMPLE 32 | A32 | 0 | 30 |
| EXAMPLE 33 | A33 | 0 | 30 |
| EXAMPLE 34 | A34 | 1 | 30 |
| EXAMPLE 35 | A35 | 0 | 30 |
| EXAMPLE 36 | A36 | 0 | 30 |
| EXAMPLE 37 | A37 | 0 | 30 |
| EXAMPLE 38 | A38 | 0 | 30 |
| EXAMPLE 39 | A39 | 0 | 30 |
| EXAMPLE 40 | A40 | 0 | 30 |
| EXAMPLE 41 | A41 | 1 | 30 |
| EXAMPLE 42 | A42 | 0 | 30 |
| EXAMPLE 43 | A43 | 0 | 30 |
| EXAMPLE 44 | A44 | 0 | 30 |
| EXAMPLE 45 | A45 | 0 | 30 |
| EXAMPLE 46 | A46 | 0 | 30 |
| EXAMPLE 47 | A47 | 1 | 30 |
| EXAMPLE 48 | A48 | 0 | 30 |
| EXAMPLE 49 | A49 | 3 | 10 |
| EXAMPLE 50 | A50 | 0 | 100 |
| EXAMPLE 51 | A51 | 0 | 500 |

TABLE 6

COLD ROLLING CONDITIONS

| | ALLOY No. | DIFFERENCE IN ROTATIONAL SPEED BETWEEN UPPER AND LOWER ROLLERS (%) | ROLLING SPEED (m/min) |
|---|---|---|---|
| COMPARATIVE EXAMPLE 1 | AC1 | 0 | 900 |
| COMPARATIVE EXAMPLE 2 | AC2 | 0 | 500 |
| COMPARATIVE EXAMPLE 3 | AC3 | 0 | 300 |
| COMPARATIVE EXAMPLE 4 | AC4 | 1 | 100 |
| COMPARATIVE EXAMPLE 5 | AC5 | 0 | 50 |
| COMPARATIVE EXAMPLE 6 | AC6 | 0 | 30 |
| COMPARATIVE EXAMPLE 7 | AC7 | 0 | 10 |
| COMPARATIVE EXAMPLE 8 | AC8 | 0 | 30 |
| COMPARATIVE EXAMPLE 9 | AC9 | 0 | 30 |
| COMPARATIVE EXAMPLE 10 | AC10 | 0 | 30 |
| COMPARATIVE EXAMPLE 11 | AC11 | 1 | 30 |
| COMPARATIVE EXAMPLE 12 | AC12 | 0 | 30 |
| COMPARATIVE EXAMPLE 13 | AC13 | 0 | 30 |
| COMPARATIVE EXAMPLE 14 | AC14 | 0 | 30 |
| COMPARATIVE EXAMPLE 15 | AC15 | 0 | 30 |
| COMPARATIVE EXAMPLE 16 | AC16 | 8 | 30 |
| COMPARATIVE EXAMPLE 17 | AC17 | 10 | 30 |
| COMPARATIVE EXAMPLE 18 | AC18 | 0 | 1400 |
| COMPARATIVE EXAMPLE 19 | AC19 | 0 | 1500 |
| COMPARATIVE EXAMPLE 20 | AC20 | 0 | 30 |
| COMPARATIVE EXAMPLE 21 | AC21 | 10 | 30 |
| COMPARATIVE EXAMPLE 22 | AC22 | 0 | 1400 |
| COMPARATIVE EXAMPLE 23 | AC23 | 0 | 1500 |

The alloys No. A1 and A3 after hot rolling and the alloy No. A40 after casting by the CC method were annealed in a batch manner at 360° C. for two hours. The resulting hot rolled plates composed of the alloys No. A1 to A39 and A43 to A48 and No. AC1 to AC15 and AC17 to AC19 and the continuous cast plates composed of the alloys No. A40 to A42 and A49 to A51 and No. AC16 and AC21 to AC23 were cold rolled under the respective conditions shown in Tables 4 to 6. This cold rolling process yielded aluminium alloy plates having a target thickness of 0.8 mm (Step S105). These aluminium alloy plates were punched to produce annular disk blanks having an outer diameter of 96 mm and an inner diameter of 24 mm (Step S106).

The resulting disk blanks were subject to pressure planarization under a pressure of 0.5 MPa at 270° C. for three hours (Step S107). The disk blanks after pressure planarization were then subject to end face processing (cutting) to have an outer diameter of 95 mm and an inner diameter of 25 mm, followed by the grinding of the surface by 50 μm. This process yielded aluminium alloy substrates (Step S108). The substrates were then degreased at 60° C. for five minutes using the degreasing solution AD-68F (commercial name, manufactured by C.Uyemura & Co., Ltd.), were subject to acid etching at 65° C. for one minute using the etchant AD-107F (commercial name, manufactured by C.Uyemura & Co., Ltd.), and were desmutted for 20 seconds using a 30% $HNO_3$ aqueous solution (at a room temperature) (Step S109).

After these surface treatments, the disk blanks underwent zincate treatments on their surfaces by being immersed in the zincate solution AD-301F-3X (commercial name, manufactured by C.Uyemura & Co., Ltd.) at 20° C. for 0.5 minutes (Step S109). The zincate treatments were conducted two times in total and accompanied by a surface peeling process between the zincate treatments, in which the disk blanks were immersed in a 30% $HNO_3$ aqueous solution at a room temperature for 20 seconds. The surfaces after zincate treatments were then provided with Ni—P having a thickness of 19.7 μm by electroless plating using the electroless Ni—P plating solution NIMUDEN HDX (commercial name, manufactured by C.Uyemura & Co., Ltd.), followed by polish finishing (at an amount of 1.7 μm) with a fabric. This process yielded plated aluminium alloy substrates for magnetic disks (Step S110).

The ground aluminium alloy substrates (Step S108) and the plated and polished aluminium alloy substrates (Step S110) were applied to evaluation described below. Each example was examined using three sample disks that had been processed until the plating process. Unfortunately, the plated layers were peeled from all the three disks according to Comparative Examples 7 and 9 to 15, so that these comparative examples failed to be applied to measurement of the Young moduli, loss factors, and levels of disk flutter.

[Measurement of the Level of Disk Flutter]

The level of disk flutter was measured using the plated and polished aluminium alloy substrates (Step S110). This measurement was conducted such that plated aluminium alloy substrates were installed in a commercially available hard disk drive ST2000 (commercial name, manufactured by Seagate Technology LLC) in the presence of air. The motor was directly coupled to and driven by the driver SLD102 (commercial name, manufactured by Tekunoaraibu kabushikigaisha). The rotational speed was set to 7200 rpm. A plurality of disks was installed all the time, and the upper one of the disks was provided with the laser Doppler vibrometer LV1800 (commercial name, manufactured by Ono Sokki Co., Ltd.) on the surface of the disk to observe vibration of the surface. The observed vibration was subject to spectrum analysis using the FFT analyzer DS3200 (commercial name, manufactured by Ono Sokki Co., Ltd.). The surface of the disk was observed through an opening preliminarily formed in the cover of the hard disk drive. The squeeze plate of the commercially available hard disk drive was preliminarily removed for evaluation.

The level of fluttering characteristics was evaluated based on the maximum displacement (level of disk flutter (nm)) of a broad peak in the range of 1500 to 2000 Hz in which flutters emerge. This broad peak is called non-repeatable run out (NRRO) and has been found to significantly affect the occurrence of errors in positioning of the head. The level of fluttering characteristics of 10 nm or less in the air was evaluated as A (excellent), the level of more than 10 nm and equal to or less than 20 nm as B (good), the level of more than 20 nm and equal to or less than 30 nm as C (fair), and the level of more than 30 nm as D (poor).

[Young Modulus]

Figure 2:
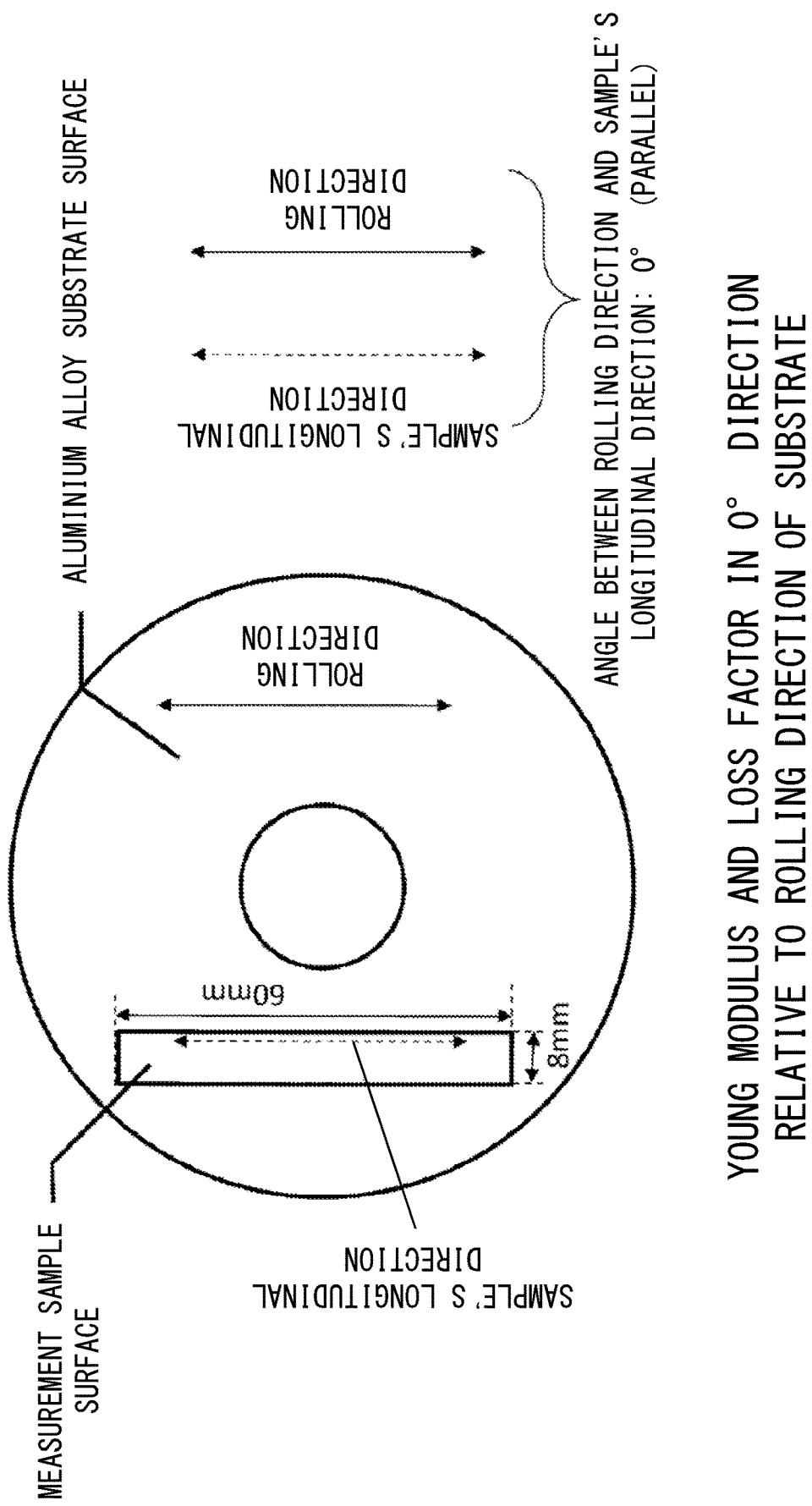
FIG. 2 is a plan view illustrating a measurement sample extending in the 0° direction relative to the rolling direction of a substrate for obtaining the Young modulus.
Figure 3:
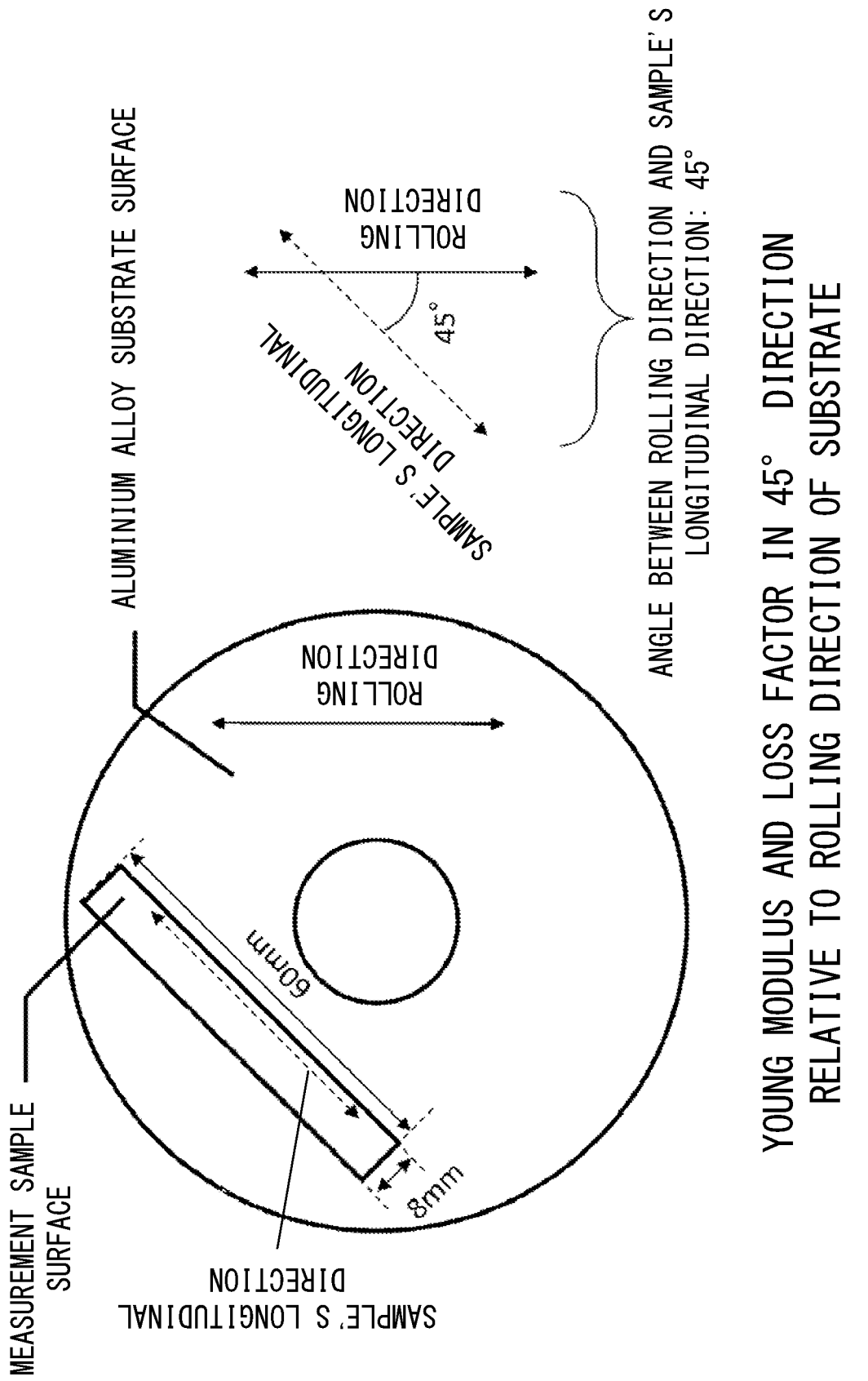
FIG. 3 is a plan view illustrating a measurement sample extending in the 45° direction relative to the rolling direction of a substrate for obtaining the Young modulus.
Figure 4:
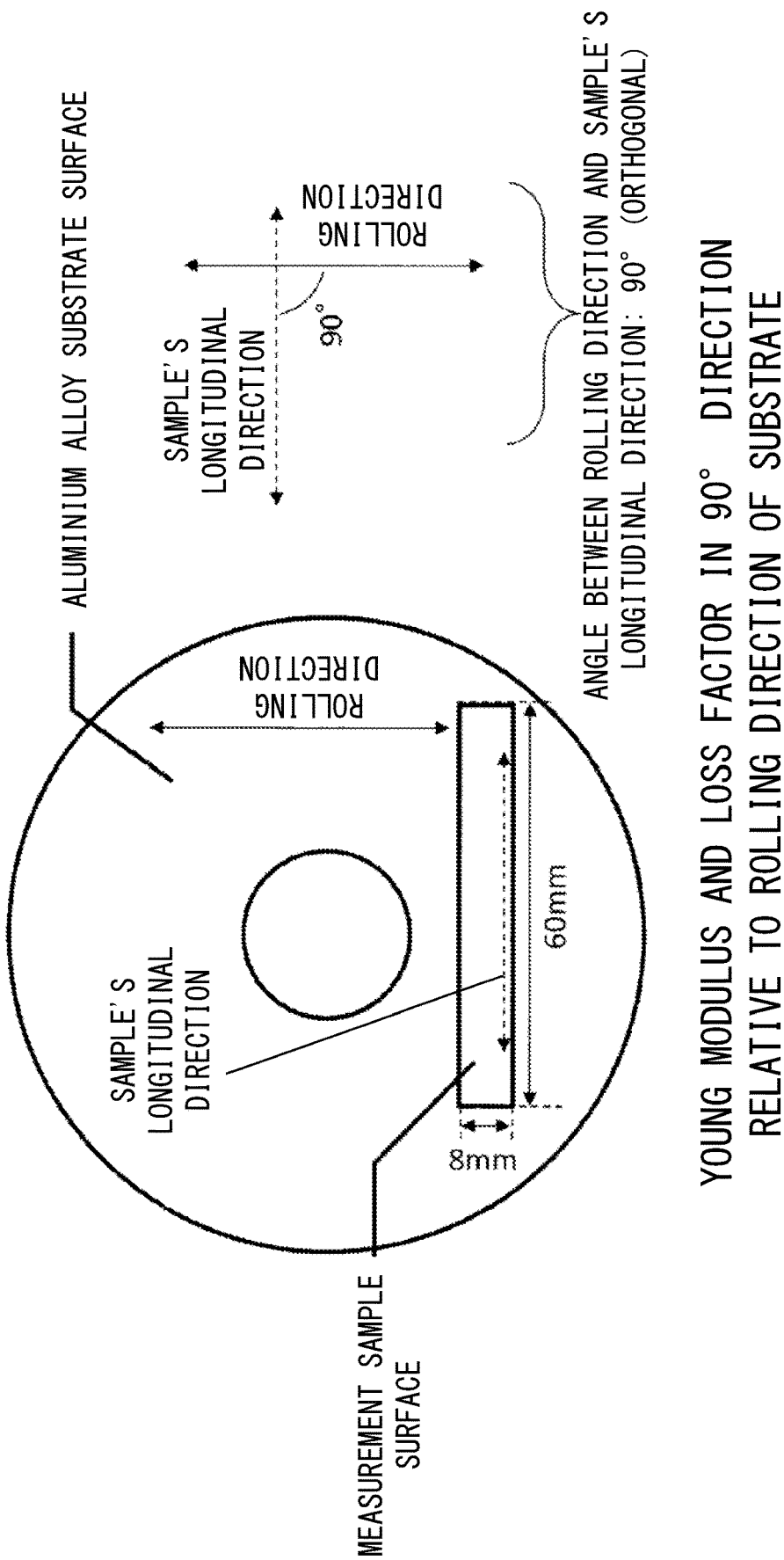
FIG. 4 is a plan view illustrating a measurement sample extending in the 90° direction relative to the rolling direction of a substrate for obtaining the Young modulus.

The Young moduli were measured on test pieces having a size of 60 mm×8 mm sampled from each of the ground aluminium alloy substrates (Step S108). FIGS. 2 to 4 illustrate a method of sampling test pieces extending in the 0° direction, 45° direction, and 90° direction relative to the rolling direction. The Young moduli were measured at a room temperature using the JE-RT device manufactured by Nihon Techno-Plus Co., Ltd. Alternatively, the Young moduli may be measured on test pieces sampled from the disk blanks after pressure planarization or the substrates obtained by peeling the plated layers from the plated aluminium alloy substrates and grinding the surfaces of the substrates by 10 μm.

[Loss Factor×Thickness]

The loss factors were measured on test pieces having a size of 60 mm×8 mm sampled from each of the ground aluminium alloy substrates (Step S108) by a vibration decay method, and were then multiplied by the thickness (mm). FIGS. 2 to 4 illustrate a method of sampling test pieces extending in the 0° direction, 45° direction, and 90° direction relative to the rolling direction. The loss factors were measured at a room temperature using the JE-RT device manufactured by Nihon Techno-Plus Co., Ltd. Alternatively, the loss factors may be measured on test pieces sampled from the disk blanks after pressure planarization or the substrates obtained by peeling the plated layers from the plated aluminium alloy substrates and grinding the surfaces of the substrates by 10 μm, and then multiplied by the thickness (mm).

The results of the above evaluation are shown in Tables 7 to 9.

TABLE 7

| | Alloy No. | Fluttering Characteristics | Young Modulus 0° Directon (GPa) | Young Modulus 45° Directon (GPa) | Young Modulus 90° Directon (GPa) | Loss Factor × Thickness 0° Directon (mm) | Loss Factor × Thickness 45° Directon (mm) | Loss Factor × Thickness 90° Directon (mm) |
|---|---|---|---|---|---|---|---|---|
| EXAMPLE 1 | A1 | B | 70 | 67 | 68 | $1.0 \times 10^{-3}$ | $1.1 \times 10^{-3}$ | $0.8 \times 10^{-3}$ |
| EXAMPLE 2 | A2 | B | 70 | 67 | 68 | $1.1 \times 10^{-3}$ | $1.0 \times 10^{-3}$ | $0.9 \times 10^{-3}$ |
| EXAMPLE 3 | A3 | A | 70 | 68 | 69 | $1.4 \times 10^{-3}$ | $1.5 \times 10^{-3}$ | $1.6 \times 10^{-3}$ |
| EXAMPLE 4 | A4 | A | 73 | 68 | 74 | $1.9 \times 10^{-3}$ | $1.8 \times 10^{-3}$ | $1.9 \times 10^{-3}$ |
| EXAMPLE 5 | A5 | A | 76 | 70 | 76 | $2.3 \times 10^{-3}$ | $2.4 \times 10^{-3}$ | $2.5 \times 10^{-3}$ |
| EXAMPLE 6 | A6 | C | 68 | 67 | 68 | $0.9 \times 10^{-3}$ | $0.6 \times 10^{-3}$ | $0.8 \times 10^{-3}$ |
| EXAMPLE 7 | A7 | B | 69 | 67 | 69 | $1.0 \times 10^{-3}$ | $1.0 \times 10^{-3}$ | $0.9 \times 10^{-3}$ |
| EXAMPLE 8 | A8 | A | 69 | 68 | 69 | $1.4 \times 10^{-3}$ | $1.6 \times 10^{-3}$ | $1.6 \times 10^{-3}$ |
| EXAMPLE 9 | A9 | A | 74 | 70 | 75 | $1.7 \times 10^{-3}$ | $1.9 \times 10^{-3}$ | $1.6 \times 10^{-3}$ |
| EXAMPLE 10 | A10 | A | 78 | 71 | 79 | $2.3 \times 10^{-3}$ | $2.4 \times 10^{-3}$ | $2.5 \times 10^{-3}$ |
| EXAMPLE 11 | A11 | B | 68 | 67 | 68 | $1.0 \times 10^{-3}$ | $1.1 \times 10^{-3}$ | $0.9 \times 10^{-3}$ |
| EXAMPLE 12 | A12 | B | 69 | 67 | 68 | $1.1 \times 10^{-3}$ | $1.0 \times 10^{-3}$ | $0.9 \times 10^{-3}$ |
| EXAMPLE 13 | A13 | A | 74 | 70 | 73 | $1.3 \times 10^{-3}$ | $1.5 \times 10^{-3}$ | $1.4 \times 10^{-3}$ |
| EXAMPLE 14 | A14 | A | 77 | 74 | 75 | $1.8 \times 10^{-3}$ | $1.7 \times 10^{-3}$ | $1.7 \times 10^{-3}$ |
| EXAMPLE 15 | A15 | A | 82 | 80 | 81 | $2.1 \times 10^{-3}$ | $1.9 \times 10^{-3}$ | $1.8 \times 10^{-3}$ |
| EXAMPLE 16 | A16 | B | 68 | 67 | 68 | $0.9 \times 10^{-3}$ | $1.1 \times 10^{-3}$ | $0.8 \times 10^{-3}$ |

TABLE 7-continued

| | Alloy No. | Fluttering Characteristics | Young Modulus 0° Direction (GPa) | Young Modulus 45° Direction (GPa) | Young Modulus 90° Direction (GPa) | Loss Factor × Thickness 0° Direction (mm) | Loss Factor × Thickness 45° Direction (mm) | Loss Factor × Thickness 90° Direction (mm) |
|---|---|---|---|---|---|---|---|---|
| EXAMPLE 17 | A17 | B | 69 | 67 | 68 | $1.2 \times 10^{-3}$ | $1.0 \times 10^{-3}$ | $1.0 \times 10^{-3}$ |
| EXAMPLE 18 | A18 | A | 70 | 68 | 69 | $1.6 \times 10^{-3}$ | $1.6 \times 10^{-3}$ | $1.5 \times 10^{-3}$ |
| EXAMPLE 19 | A19 | A | 73 | 70 | 73 | $2.0 \times 10^{-3}$ | $2.1 \times 10^{-3}$ | $1.9 \times 10^{-3}$ |
| EXAMPLE 20 | A20 | A | 77 | 72 | 78 | $4.8 \times 10^{-3}$ | $5.0 \times 10^{-3}$ | $4.8 \times 10^{-3}$ |
| EXAMPLE 21 | A21 | B | 68 | 67 | 68 | $1.1 \times 10^{-3}$ | $1.1 \times 10^{-3}$ | $0.8 \times 10^{-3}$ |
| EXAMPLE 22 | A22 | B | 69 | 67 | 68 | $1.1 \times 10^{-3}$ | $1.2 \times 10^{-3}$ | $1.1 \times 10^{-3}$ |
| EXAMPLE 23 | A23 | A | 70 | 68 | 69 | $1.5 \times 10^{-3}$ | $1.4 \times 10^{-3}$ | $1.5 \times 10^{-3}$ |
| EXAMPLE 24 | A24 | A | 74 | 71 | 75 | $2.0 \times 10^{-3}$ | $1.7 \times 10^{-3}$ | $2.1 \times 10^{-3}$ |
| EXAMPLE 25 | A25 | A | 78 | 72 | 78 | $2.5 \times 10^{-3}$ | $2.6 \times 10^{-3}$ | $2.7 \times 10^{-3}$ |
| EXAMPLE 26 | A26 | B | 68 | 67 | 68 | $0.9 \times 10^{-3}$ | $1.0 \times 10^{-3}$ | $0.9 \times 10^{-3}$ |
| EXAMPLE 27 | A27 | B | 69 | 67 | 68 | $1.1 \times 10^{-3}$ | $1.1 \times 10^{-3}$ | $0.9 \times 10^{-3}$ |
| EXAMPLE 28 | A28 | A | 70 | 68 | 69 | $1.4 \times 10^{-3}$ | $1.6 \times 10^{-3}$ | $1.6 \times 10^{-3}$ |
| EXAMPLE 29 | A29 | A | 74 | 71 | 74 | $2.0 \times 10^{-3}$ | $1.9 \times 10^{-3}$ | $1.9 \times 10^{-3}$ |
| EXAMPLE 30 | A30 | A | 77 | 72 | 78 | $2.3 \times 10^{-3}$ | $2.3 \times 10^{-3}$ | $2.2 \times 10^{-3}$ |

TABLE 8

| | Alloy No. | Fluttering Characteristics | Young Modulus 0° Direction (GPa) | Young Modulus 45° Direction (GPa) | Young Modulus 90° Direction (GPa) | Loss Factor × Thickness 0° Direction (mm) | Loss Factor × Thickness 45° Direction (mm) | Loss Factor × Thickness 90° Direction (mm) |
|---|---|---|---|---|---|---|---|---|
| EXAMPLE 31 | A31 | A | 73 | 69 | 73 | $1.8 \times 10^{-3}$ | $1.7 \times 10^{-3}$ | $1.7 \times 10^{-3}$ |
| EXAMPLE 32 | A32 | A | 72 | 68 | 72 | $1.8 \times 10^{-3}$ | $1.8 \times 10^{-3}$ | $1.7 \times 10^{-3}$ |
| EXAMPLE 33 | A33 | A | 73 | 68 | 72 | $1.2 \times 10^{-3}$ | $1.1 \times 10^{-3}$ | $1.3 \times 10^{-3}$ |
| EXAMPLE 34 | A34 | A | 73 | 68 | 72 | $1.6 \times 10^{-3}$ | $1.7 \times 10^{-3}$ | $1.6 \times 10^{-3}$ |
| EXAMPLE 35 | A35 | A | 72 | 68 | 71 | $1.7 \times 10^{-3}$ | $1.6 \times 10^{-3}$ | $1.7 \times 10^{-3}$ |
| EXAMPLE 36 | A36 | A | 76 | 70 | 75 | $1.2 \times 10^{-3}$ | $1.3 \times 10^{-3}$ | $1.1 \times 10^{-3}$ |
| EXAMPLE 37 | A37 | A | 78 | 71 | 76 | $1.7 \times 10^{-3}$ | $1.8 \times 10^{-3}$ | $1.7 \times 10^{-3}$ |
| EXAMPLE 38 | A38 | A | 75 | 73 | 77 | $1.8 \times 10^{-3}$ | $1.8 \times 10^{-3}$ | $1.9 \times 10^{-3}$ |
| EXAMPLE 39 | A39 | A | 75 | 74 | 75 | $2.1 \times 10^{-3}$ | $1.9 \times 10^{-3}$ | $1.9 \times 10^{-3}$ |
| EXAMPLE 40 | A40 | A | 76 | 73 | 78 | $1.9 \times 10^{-3}$ | $1.8 \times 10^{-3}$ | $1.8 \times 10^{-3}$ |
| EXAMPLE 41 | A41 | A | 75 | 72 | 76 | $1.9 \times 10^{-3}$ | $1.9 \times 10^{-3}$ | $1.8 \times 10^{-3}$ |
| EXAMPLE 42 | A42 | A | 75 | 71 | 75 | $2.0 \times 10^{-3}$ | $1.9 \times 10^{-3}$ | $1.9 \times 10^{-3}$ |
| EXAMPLE 43 | A43 | A | 76 | 70 | 76 | $1.9 \times 10^{-3}$ | $1.8 \times 10^{-3}$ | $1.8 \times 10^{-3}$ |
| EXAMPLE 44 | A44 | A | 75 | 72 | 74 | $2.0 \times 10^{-3}$ | $1.8 \times 10^{-3}$ | $1.9 \times 10^{-3}$ |
| EXAMPLE 45 | A45 | A | 75 | 73 | 76 | $1.9 \times 10^{-3}$ | $1.8 \times 10^{-3}$ | $1.8 \times 10^{-3}$ |
| EXAMPLE 46 | A46 | A | 76 | 72 | 75 | $1.9 \times 10^{-3}$ | $1.7 \times 10^{-3}$ | $1.9 \times 10^{-3}$ |
| EXAMPLE 47 | A47 | A | 75 | 71 | 74 | $1.9 \times 10^{-3}$ | $2.1 \times 10^{-3}$ | $1.8 \times 10^{-3}$ |
| EXAMPLE 48 | A48 | A | 75 | 72 | 76 | $2.1 \times 10^{-3}$ | $1.8 \times 10^{-3}$ | $1.9 \times 10^{-3}$ |
| EXAMPLE 49 | A49 | A | 76 | 72 | 76 | $1.9 \times 10^{-3}$ | $1.9 \times 10^{-3}$ | $1.8 \times 10^{-3}$ |
| EXAMPLE 50 | A50 | A | 75 | 72 | 76 | $1.9 \times 10^{-3}$ | $1.9 \times 10^{-3}$ | $1.8 \times 10^{-3}$ |
| EXAMPLE 51 | A51 | A | 76 | 72 | 76 | $1.9 \times 10^{-3}$ | $1.9 \times 10^{-3}$ | $1.8 \times 10^{-3}$ |

TABLE 9

| | Alloy No. | Fluttering Characteristics | Young Modulus 0° Direction (GPa) | Young Modulus 45° Direction (GPa) | Young Modulus 90° Direction (GPa) | Loss Factor × Thickness 0° Direction (mm) | Loss Factor × Thickness 45° Direction (mm) | Loss Factor × Thickness 90° Direction (mm) |
|---|---|---|---|---|---|---|---|---|
| COMPARATIVE EXAMPLE 1 | AC1 | D | 67 | 65 | 67 | $0.6 \times 10^{-3}$ | $0.6 \times 10^{-3}$ | $0.5 \times 10^{-3}$ |
| COMPARATIVE EXAMPLE 2 | AC2 | D | 67 | 65 | 68 | $0.6 \times 10^{-3}$ | $0.7 \times 10^{-3}$ | $0.6 \times 10^{-3}$ |
| COMPARATIVE EXAMPLE 3 | AC3 | D | 67 | 64 | 67 | $0.5 \times 10^{-3}$ | $0.6 \times 10^{-3}$ | $0.7 \times 10^{-3}$ |
| COMPARATIVE EXAMPLE 4 | AC4 | D | 67 | 65 | 67 | $0.6 \times 10^{-3}$ | $0.7 \times 10^{-3}$ | $0.6 \times 10^{-3}$ |
| COMPARATIVE EXAMPLE 5 | AC5 | D | 67 | 65 | 68 | $0.5 \times 10^{-3}$ | $0.5 \times 10^{-3}$ | $0.7 \times 10^{-3}$ |
| COMPARATIVE EXAMPLE 6 | AC6 | D | 68 | 65 | 67 | $0.6 \times 10^{-3}$ | $0.6 \times 10^{-3}$ | $0.6 \times 10^{-3}$ |

TABLE 9-continued

| | ALLOY No. | FLUTTERING CHARACTERISTICS | YOUNG MODULUS | | | LOSS FACTOR × THICKNESS | | |
|---|---|---|---|---|---|---|---|---|
| | | | 0° DIRECTON (GPa) | 45° DIRECTON (GPa) | 90° DIRECTON (GPa) | 0° DIRECTON (mm) | 45° DIRECTON (mm) | 90° DIRECTON (mm) |
| COMPARATIVE EXAMPLE 7 | AC7 | — | — | — | — | — | — | — |
| COMPARATIVE EXAMPLE 8 | AC8 | D | 65 | 66 | 65 | $0.6 \times 10^{-3}$ | $0.6 \times 10^{-3}$ | $0.6 \times 10^{-3}$ |
| COMPARATIVE EXAMPLE 9 | AC9 | — | — | — | — | — | — | — |
| COMPARATIVE EXAMPLE 10 | AC10 | — | — | — | — | — | — | — |
| COMPARATIVE EXAMPLE 11 | AC11 | — | — | — | — | — | — | — |
| COMPARATIVE EXAMPLE 12 | AC12 | — | — | — | — | — | — | — |
| COMPARATIVE EXAMPLE 13 | AC13 | — | — | — | — | — | — | — |
| COMPARATIVE EXAMPLE 14 | AC14 | — | — | — | — | — | — | — |
| COMPARATIVE EXAMPLE 15 | AC15 | — | — | — | — | — | — | — |
| COMPARATIVE EXAMPLE 16 | AC16 | D | 73 | 66 | 74 | $1.8 \times 10^{-3}$ | $0.6 \times 10^{-3}$ | $1.8 \times 10^{-3}$ |
| COMPARATIVE EXAMPLE 17 | AC17 | D | 72 | 65 | 73 | $1.8 \times 10^{-3}$ | $0.6 \times 10^{-3}$ | $2.0 \times 10^{-3}$ |
| COMPARATIVE EXAMPLE 18 | AC18 | D | 72 | 65 | 72 | $1.8 \times 10^{-3}$ | $2.0 \times 10^{-3}$ | $1.6 \times 10^{-3}$ |
| COMPARATIVE EXAMPLE 19 | AC19 | D | 73 | 65 | 72 | $2.0 \times 10^{-3}$ | $1.7 \times 10^{-3}$ | $2.1 \times 10^{-3}$ |
| COMPARATIVE EXAMPLE 20 | AC20 | D | 65 | 67 | 67 | $0.7 \times 10^{-3}$ | $0.7 \times 10^{-3}$ | $0.6 \times 10^{-3}$ |
| COMPARATIVE EXAMPLE 21 | AC21 | D | 72 | 65 | 73 | $1.8 \times 10^{-3}$ | $0.5 \times 10^{-3}$ | $1.8 \times 10^{-3}$ |
| COMPARATIVE EXAMPLE 22 | AC22 | D | 72 | 65 | 72 | $1.8 \times 10^{-3}$ | $1.8 \times 10^{-3}$ | $1.6 \times 10^{-3}$ |
| COMPARATIVE EXAMPLE 23 | AC23 | D | 73 | 65 | 72 | $1.9 \times 10^{-3}$ | $1.7 \times 10^{-3}$ | $1.8 \times 10^{-3}$ |

As shown in Tables 7 and 8, Examples 1 to 51 were able to satisfy the properties defined in the disclosure and achieve preferable fluttering characteristics.

In contrast, in Comparative Example 1, the substrate had a low Young modulus in the 45° direction and had inferior fluttering characteristics, because of the excessively low Fe content of the aluminium alloy.

In Comparative Example 2, the substrate had a low Young modulus in the 45° direction and had inferior fluttering characteristics, because of the excessively low Mn content of the aluminium alloy.

In Comparative Example 3, the substrate had a low Young modulus in the 45° direction and had inferior fluttering characteristics, because of the excessively low Si content of the aluminium alloy.

In Comparative Example 4, the substrate had a low Young modulus in the 45° direction and had inferior fluttering characteristics, because of the excessively low Ni content of the aluminium alloy.

In Comparative Example 5, the substrate had a low Young modulus in the 45° direction and had inferior fluttering characteristics, because of the excessively low Cr content of the aluminium alloy.

In Comparative Example 6, the substrate had a low Young modulus in the 45° direction and had inferior fluttering characteristics, because of the excessively low Zr content of the aluminium alloy.

In Comparative Example 7, the plated layer was peeled from the substrate, as described above, because of the excessively high Cu content of the aluminum alloy. This substrate was not able to be evaluated in terms of the fluttering characteristics and was not suitable for a magnetic disk.

In Comparative Example 8, the substrate had low Young moduli in the 0° direction, 45° direction, and 90° direction and had inferior fluttering characteristics, because of the excessively high Mg content of the aluminium alloy.

In Comparative Example 9, the plated layer was peeled from the substrate, as described above, because of the excessively high Zn content of the aluminum alloy. This substrate was not able to be evaluated in terms of the fluttering characteristics and was not suitable for a magnetic disk.

In Comparative Example 10, the plated layer was peeled from the substrate, as described above, because of the excessively high Fe content of the aluminum alloy. This substrate was not able to be evaluated in terms of the fluttering characteristics and was not suitable for a magnetic disk.

In Comparative Example 11, the plated layer was peeled from the substrate, as described above, because of the excessively high Mn content of the aluminum alloy. This substrate was not able to be evaluated in terms of the fluttering characteristics and was not suitable for a magnetic disk.

In Comparative Example 12, the plated layer was peeled from the substrate, as described above, because of the excessively high Si content of the aluminum alloy. This substrate was not able to be evaluated in terms of the fluttering characteristics and was not suitable for a magnetic disk.

In Comparative Example 13, the plated layer was peeled from the substrate, as described above, because of the excessively high Ni content of the aluminum alloy. This substrate was not able to be evaluated in terms of the fluttering characteristics and was not suitable for a magnetic disk.

In Comparative Example 14, the plated layer was peeled from the substrate, as described above, because of the excessively high Cr content of the aluminum alloy. This substrate was not able to be evaluated in terms of the fluttering characteristics and was not suitable for a magnetic disk.

In Comparative Example 15, the plated layer was peeled from the substrate, as described above, because of the excessively high Zr content of the aluminum alloy. This substrate was not able to be evaluated in terms of the fluttering characteristics and was not suitable for a magnetic disk.

In Comparative Examples 16 and 17, the substrate had a low Young modulus in the 45° direction and had inferior fluttering characteristics, because of the excessively large difference in rotational speed between the upper and lower rollers in the cold rolling process.

In Comparative Examples 18 and 19, the substrate had a low Young modulus in the 45° direction and had inferior fluttering characteristics, because of the excessively high rolling speed in the cold rolling process.

In Comparative Example 20, the substrate had a low Young modulus in the 0° direction and had inferior fluttering characteristics, because of the excessively high Mg content of the aluminum alloy.

In Comparative Example 21, the substrate had a low Young modulus in the 45° direction and had inferior fluttering characteristics, because of the excessively large difference in rotational speed between the upper and lower rollers in the cold rolling process.

In Comparative Examples 22 and 23, the substrate had a low Young modulus in the 45° direction and had inferior fluttering characteristics, because of the excessively high rolling speed in the cold rolling process.

INDUSTRIAL APPLICABILITY

The disclosure can provide an aluminium alloy substrate for a magnetic disk that can achieve preferable fluttering characteristics, a method of fabricating the substrate, and a magnetic disk composed of the aluminium alloy substrate for a magnetic disk.

The invention claimed is:

1. An aluminium alloy substrate for a magnetic disk, the substrate comprising an aluminium alloy comprising:
   one or more elements selected from a group consisting of 0.05 to 3.00 mass % of Fe, 0.05 to 3.00 mass % of Mn, 0.05 to 18.00 mass % of Si, 0.05 to 8.00 mass % of Ni, 0.05 to 3.00 mass % of Cr, and 0.05 to 3.00 mass % of Zr, and one or more elements selected from a group consisting of 0.003 to 8.000 mass % of Cu, 0.05 to 0.90 mass % of Mg and 0.005 to 8.000 mass % of Zn, with a balance of Al and unavoidable impurities, wherein
   the substrate has a Young modulus of 67 GPa or more in each of a 0° direction, 45° direction, and 90° direction relative to a rolling direction of the substrate.

2. The aluminium alloy substrate for a magnetic disk according to any claim 1, wherein the aluminium alloy further comprises one or more elements selected from a group consisting of Ti, B, and V at a total content of 0.005 to 0.500 mass %.

3. The aluminium alloy substrate for a magnetic disk according to claim 1, wherein a product of a loss factor and a thickness (mm) of the substrate is $0.7 \times 10^{-3}$ mm or more in each of the 0° direction, 45° direction, and 90° direction relative to the rolling direction of the substrate.

4. A magnetic disk comprising:
   the aluminium alloy substrate for a magnetic disk according to claim 1;
   an electroless Ni—P plated layer on a surface of the substrate; and
   a magnetic material layer on the plated layer.

5. A method of fabricating the aluminium alloy substrate for a magnetic disk according to claim 1, the method comprising:
   a semi-continuous casting step on casting the aluminium alloy to produce an ingot by a semi-continuous casting method;
   a hot rolling step of hot rolling the ingot to produce a hot rolled plate;
   a cold rolling step of cold rolling the hot rolled plate;
   a disk blank punching step of punching the cold rolled plate to produce a disk blank having an annular shape;
   a pressure annealing step of pressure annealing the disk blank; and
   a cutting and grinding step of cutting and grinding the pressure annealed disk blank, wherein
   in the cold rolling step, a difference in rotational speed between upper and lower rollers is 5% or less and a rolling speed is 1000 m/min or less.

6. A method of fabricating the aluminum alloy substrate for a magnetic disk according to claim 1, the method comprising:
   a continuous casting step of casting the aluminium alloy to produce a cast plate by a continuous casting method;
   a cold rolling step of cold tolling the cast plate after continuous casting;
   a disk blank punching step of punching the cold rolled plate to produce a disk blank having an annular shape;
   a pressure annealing step of pressure annealing the disk blank; and
   a cutting and grinding step of cutting and grinding the pressure annealed disk blank, wherein
   in the cold rolling step, a difference in rotational speed between upper and lower rollers is 5% or less and a rolling speed is 1000 m/min or less.

* * * * *

UNITED STATES PATENT AND TRADEMARK OFFICE
CERTIFICATE OF CORRECTION

| | | |
|---|---|---|
| PATENT NO. | : 11,404,082 B2 | Page 1 of 1 |
| APPLICATION NO. | : 16/648481 | |
| DATED | : August 2, 2022 | |
| INVENTOR(S) | : Kitawaki et al. | |

It is certified that error appears in the above-identified patent and that said Letters Patent is hereby corrected as shown below:

In the Claims

In Column 26, Line 46, Claim 6, delete "tolling" and insert -- rolling -- therefore.

Signed and Sealed this
Fourth Day of October, 2022

*Katherine Kelly Vidal*

Katherine Kelly Vidal
*Director of the United States Patent and Trademark Office*